United States Patent
Miyata et al.

(10) Patent No.: US 9,773,061 B2
(45) Date of Patent: Sep. 26, 2017

(54) DATA DISTRIBUTED SEARCH SYSTEM, DATA DISTRIBUTED SEARCH METHOD, AND MANAGEMENT COMPUTER

(75) Inventors: Yasushi Miyata, Tokyo (JP); Hiroyasu Nishiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 14/396,551

(22) PCT Filed: May 24, 2012

(86) PCT No.: PCT/JP2012/063335
§ 371 (c)(1),
(2), (4) Date: Oct. 23, 2014

(87) PCT Pub. No.: WO2013/175611
PCT Pub. Date: Nov. 28, 2013

(65) Prior Publication Data
US 2015/0120736 A1    Apr. 30, 2015

(51) Int. Cl.
*G06F 17/30* (2006.01)

(52) U.S. Cl.
CPC .. *G06F 17/30864* (2013.01); *G06F 17/30598* (2013.01); *G06F 17/30958* (2013.01); *G06F 17/30964* (2013.01)

(58) Field of Classification Search
None
See application file for complete search history.

(56) References Cited

U.S. PATENT DOCUMENTS 5,806,059 A    9/1998  Tsuchida et al.
6,026,394 A    2/2000  Tsuchida et al.
(Continued)

FOREIGN PATENT DOCUMENTS

JP    06-214843 A    8/1994
JP    06-259478 A    9/1994
(Continued)

OTHER PUBLICATIONS

Feigenbaum, Lee; "Why SPARQL?"; TechnicaLee Speaking: Software designs, implementations, solutions, and musings by Lee Feigenbaum; published on Jan. 25, 2008, and retrieved on Nov. 15, 2016 from http://www.thefigtrees.net/lee/blog/2008/01/why_sparql.html.*

(Continued)

*Primary Examiner* — Alex Gofman
*Assistant Examiner* — Umar Mian
(74) *Attorney, Agent, or Firm* — Mattingly & Malur, PC

(57) ABSTRACT

An administrative computer which is connected to a plurality of search execution computers, includes: a distributed administration manager which receives graphs which retains a relation which connects data value and is configured with a group which is connected by the relation, and distributes same among a plurality of search execution computers; and a distributed search manager which, when a search condition is received, transmits the search condition to the plurality of search execution computers, and receives search results. The distributed administration manager groups the graphs with matching relations, segments the graphs which is associated with the group, and positions same on the plurality of search execution computers. The distributed search manager transmits search conditions including search conditions of the relations between the data and search conditions of the data value to each of the plurality of search execution computers, and has the search executed in parallel.

18 Claims, 21 Drawing Sheets

(56) References Cited

U.S. PATENT DOCUMENTS

| | | | |
|---|---|---|---|
| 6,256,621 B1 | | 7/2001 | Tsuchida et al. |
| 6,567,806 B1 | | 5/2003 | Tsuchida et al. |
| 7,386,616 B1 | * | 6/2008 | Henzinger ............... G06F 9/505 |
| | | | 709/226 |
| 7,685,109 B1 | | 3/2010 | Ransil et al. |
| 9,177,069 B1 | * | 11/2015 | Seth .................... G06F 17/3087 |
| 9,385,845 B1 | * | 7/2016 | Austern ............ G06F 17/30958 |
| 2001/0014888 A1 | | 8/2001 | Tsuchida et al. |
| 2003/0074352 A1 | * | 4/2003 | Raboczi ............ G06F 17/30545 |
| 2005/0262045 A1 | | 11/2005 | Tsuchida et al. |
| 2006/0041599 A1 | | 2/2006 | Tsuchida et al. |
| 2007/0168336 A1 | | 7/2007 | Ransil et al. |
| 2008/0140630 A1 | | 6/2008 | Sato et al. |
| 2010/0268722 A1 | * | 10/2010 | Yalamanchi ...... G06F 17/30958 |
| | | | 707/759 |
| 2012/0297307 A1 | * | 11/2012 | Rider .................. G06F 11/3433 |
| | | | 715/736 |
| 2013/0066814 A1 | * | 3/2013 | Bosch ............... G06F 17/30707 |
| | | | 706/12 |

FOREIGN PATENT DOCUMENTS

| | | |
|---|---|---|
| JP | 2006-195533 A | 7/2006 |
| JP | 2008-146412 A | 6/2008 |
| WO | 2007/079303 A2 | 7/2007 |
| WO | 2011/067932 A1 | 6/2011 |

OTHER PUBLICATIONS

Huang et al., "Scalable SPARQL Querying of Large RDF Graphs" VLDB Endowment Inc., vol. 4 (VLDB 2011).

* cited by examiner

| 601 | 602 |
|---|---|
| GROUP ID | RELATION LIST |
| 1 | NAME, PRICE, RELEASE DATE |
| 2 | NAME, VEHICLE FAMILY, PRICE, MODEL YEAR, MODEL |
| 3 | NAME, PRODUCTION AREA, PRICE |
| ... | ... |

600 GROUP MANAGEMENT TABLE

*FIG. 6*

| 701 | 702 |
|---|---|
| GRAPH ID | GROUP ID |
| AAA | 1 |
| BBB | 1 |
| CCC | 2 |
| ... | ... |

700 GROUP ASSIGNMENT MANAGEMENT TABLE

*FIG. 7*

| GROUP ID | NUMBER OF GRAPHS ALLOCATED TO SEARCH EXECUTION COMPUTER 1 | NUMBER OF GRAPHS ALLOCATED TO SEARCH EXECUTION COMPUTER 2 | ... |
|---|---|---|---|
| 1 | 200 | 201 | ... |
| 2 | 300 | 299 | ... |
| 3 | 501 | 500 | ... |
| ... | ... | ... | ... |

800 ALLOCATION MANAGEMENT TABLE

*FIG. 8*

| RETRIEVED RELATION ~7211 | RELATION RETRIEVAL COUNT ~7212 |
|---|---|
| NAME | 50000 |
| PRICE | 40000 |
| VEHICLE FAMILY | 100 |
| ... | ... |

721 RELATION RETRIEVAL COUNT MANAGEMENT TABLE

*FIG. 11*

| RELATION ~901 | APPEARANCE COUNT ~902 |
|---|---|
| NAME | 50000 |
| PRICE | 40000 |
| VEHICLE FAMILY | 100 |
| ... | ... |

900 RELATION APPEARANCE COUNT MANAGEMENT TABLE

*FIG. 15*

DATA DISTRIBUTED SEARCH SYSTEM, DATA DISTRIBUTED SEARCH METHOD, AND MANAGEMENT COMPUTER

BACKGROUND

This invention relates to improvement in computer system and method for distributing and storing graphs to a plurality of computers and searching the distributed graphs in parallel.

Graphs are used to express given relations among data pieces. A graph is a set of data in which a data piece holds a data value and at least one relation with another data piece and is connected with the other data pieces by the relations.

There exist a graph database apparatus for storing and administrating graphs and a graph search apparatus for extracting a desired graph from the graphs stored in the graph database. The graph search apparatus extracts a graph or graphs matching the conditions defined with a data value and a relation of data pieces from the graph database apparatus.

To expedite searching a massive number of graphs, there is a known technique that distributes and shares graphs among a plurality of server nodes and conducts parallel searches at the server nodes.

Receiving and merging results of the parallel searches in the plurality of server nodes at a management server leads to obtaining a result including the same graphs obtained by searching all the graphs. It should be noted, however, if related data is distributed among a plurality of server nodes, the plurality of server nodes need to determine whether the related data satisfy conditions with one another because, in searching graphs, the search conditions consist of a data value and a data relation. Determination on the conditions in the plurality of server nodes might require communications among the server nodes, causing delay in the processing. In order to prevent this delay, Non-Patent Literature 1 discloses a technique that stores data connected by relations in the same server node.

The technique disclosed in Non-Patent Literature 1 eliminates communications among the server nodes in searching; the search time required for each server node is the time taken by searching the graphs held in each server node to extract graphs matching the conditions designated with a data value and a data relation. Since each server node conducts a search in parallel, the time to obtain all the search results depends on the server node that takes the longest time in searching. The details of the search are common to all servers; accordingly, the time to obtain all the search results depends on the number of graphs to be searched by each server node.

Now, graphs to be searched are explained. In general, searching data uses labels called an index to extract one or more data pieces matching a part or all of the search conditions. The index for the graphs is dictionary data in which data values and data relations are sorted in a specific order. Extracting a data range matching a part or all of the search conditions from this dictionary data leads to acquisition of intended graphs without checking the entirety of the graphs. If extracted at this phase is a data range matching a part of the search conditions, it is necessary to determine, assuming that the extracted data range provides possible solutions, whether each possible solution matches the remaining search conditions. The number of possible solutions corresponds to the number of graphs to be searched. If no index is provided, all the graphs are possible solutions.

The number of graphs to be searched depends on the details of the search and the allocation of the graphs to the server nodes. Accordingly, if a specific server has more graphs than the other servers, the load to the specific server increases to cause delay in searching. To solve this problem, Patent Literature 1 discloses a technique that holds the records of the details of past searches and the volume of searched data and reallocates data from a server node having a large volume of searched data to a server node having a small volume to achieve load balancing.

CITATION LIST

Patent Literature 1: JP H06-259478 A
Non-Patent Literature 1: Huang, J., Abadi, D. and Ren, K., "Scalable SPARQL Querying of Large RDF Graphs", VLDB Endowment Inc., Vol. 4 (VLDB 2011)

SUMMARY

In application of the technique disclosed in Patent Literature 1 to a system that keeps searching graphs, when transferring to reallocate graphs from a server node to another increases the load, the searching might be delayed. Furthermore, the technique disclosed in Patent Literature 1 makes this determination using the details of past searches. Accordingly, there exists a problem that, in adding a new graph, whether the new graph includes data to be frequently retrieved cannot be determined, so that the server node to allocate the graph cannot be determined to achieve load balancing.

This invention aims to improve the search performance in a system that administrates graphs distributed among a plurality of server nodes. The system distributes data to a plurality of server nodes, and merges the result of having performed search processing of the same contents by each server node.

A representative aspect of the present disclosure is as follows. A data distributed search system comprising: a management computer including a processor and a memory; a plurality of search execution computers each including a processor and a memory; and a network connecting the management computer and the plurality of search execution computers, wherein the management computer includes: a distributed administration manager for receiving graphs, each of the graphs holding at least one relation connecting a data value with another data value and being composed of data pieces connected by the at least one relation, and distributing the graphs to the plurality of search execution computers; and a distributed search manager for sending search conditions to the plurality of search execution computers upon receipt of the search conditions and receiving search results from the plurality of search execution computers, wherein each of the search execution computer includes: a graph storage module for storing graphs received from the management computer; and a search execution module for searching the graphs with the search conditions received from the management computer and returning a search result to the management computer, wherein the distributed administration manager of the management computer classifies graphs including at least one common relation as a group and distributes and allocates the graphs belonging to the group to the plurality of search execution computers, wherein the distributed search manager of the management computer sends search conditions including a search condition on data relation and a search condition on data value to each of the plurality of search execution computers to request to conduct a parallel search, wherein the search execution module in each of the plurality of search execution computers extracts graphs matching the search condition on data relation as possible solutions and conducts condition matching on data values included in the graphs extracted as possible solutions with the search condition on data value to acquire a data piece of which the data value matches the search condition on data value as a search result.

An aspect of this invention can improve the search performance of a system that administrates graphs distributed among a plurality of server nodes. Problems, configurations, and effects other than those described above will be clarified in the following description of the embodiments.

BRIEF DESCRIPTION OF THE DRAWINGS

FIG. 6 is a view illustrating an example of the group management table according to the first embodiment of this invention.

FIG. 7 is a view illustrating an example of the group assignment management table according to the first embodiment of this invention.

FIG. 8 is a view illustrating an example of the allocation management table according to the first embodiment of this invention.

FIG. 11 is a view illustrating an example of a relation retrieval count management table according to a third embodiment of this invention.

FIG. 15 is a view illustrating an example of the relation appearance count management table according to the fourth embodiment of this invention.

DETAILED DESCRIPTION OF THE EMBODIMENTS

Hereinafter, embodiments of this invention will be described in detail with drawings.

Embodiment 1

Figure 1:
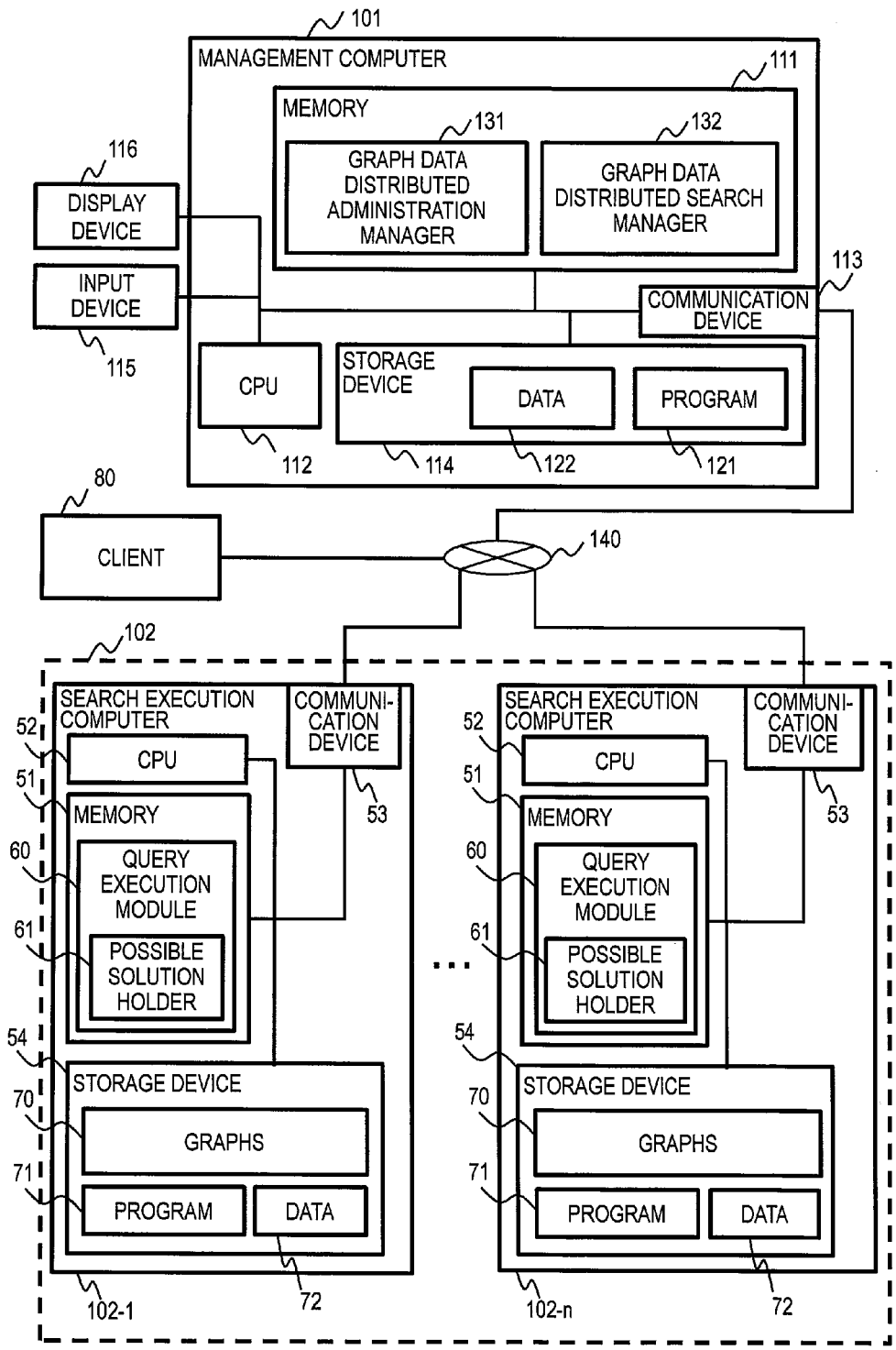
FIG. 1 is a block diagram illustrating a configuration example of a computer system for implementing distributed administration and search of graphs according to a first embodiment of this invention.

Embodiment 1 describes an example of a graph data distributed administration and search system. To search graphs with conditions on data value and data relation, the system classifies graphs matching the search conditions (conditions on data value and data relation) as a group of graphs to be searched. The system further distributes and allocates the group of graphs to a plurality of search execution computers or search execution nodes, and searches the distributed graphs. FIG. 1 illustrates a configuration example of a computer system for implementing distributed administration and search of graphs in Embodiment 1. FIG. 1 is a block diagram illustrating an example of a computer system for distributed administration and search of graphs.

The computer system for implementing distributed administration and search of graphs illustrated in FIG. 1 includes a management computer 101 for managing administration and search of graphs, a plurality of search execution computers 102-1 to 102-$n$ ($n$ is any natural number) for holding and searching graphs, a client 80 for issuing a request for search, and a network 140 connecting these computers.

The management computer 101 can be implemented with a computer including a memory 111, a CPU 112, a communication device 113, a storage device 114 including an auxiliary storage device such as a hard disk, an input device 115, and a display device 116.

Each of the plurality of search execution computers 102-1 to 102-$n$ can also be implemented with a computer same as the management computer 101. The search execution computers 102-1 to 102-$n$ are generally denoted by a reference sign 102.

The input device 115 of the management computer 101 includes a keyboard, a mouse, and/or a touch panel and is a device for inputting the user's instructions, such as an instruction to start a program. The display device 116 may be a monitor and displays statuses and results of processing in the management computer 101. The CPU 112 executes programs stored in the memory 111. The communication device 113 exchanges data and commands with other apparatuses using a communication line such as a LAN. The storage device 114 stores programs 121 and data 122 for the management computer 101 to perform processing. The memory 111 stores programs 121 run by the management computer 101 and transitory data 122.

This embodiment provides description using a configuration example in which the management computer 101 and the search execution computers 102 are physically independent; however, this invention is not limited to such a configuration and all or a part of the computers may be configured logically.

To achieve distributed allocation of graphs among a plurality of search execution computers 102, the management computer 101 classifies a received graph to be stored as a group including the same data relations upon receipt of it. The management computer 101 selects a search execution computer 102 holding the fewest graphs of the same group and sends the graph 70 to the search execution computer 102 with the communication device 113. The search execution computer 102 stores the graph received with the communication device 53 into the storage device 54 as a graph 70.

Programs to be run on the management computer 101 to implement distributed administration and search of graphs are described. The CPU 112 of the management computer 101 loads a program 121 and data 112 stored in the storage device 114 to the memory 111 and executes the program 121. The program 121 provides a graph data distributed administration manager 131 and a graph data distributed search manager 132. Using these programs, the management computer 101 sends and receives data to and from a plurality of search execution computers through the communication devices to implement distributed search and administration of graphs.

The CPU 112 operates in accordance with programs for function modules to work as the function modules for implementing predetermined functions. For example, the CPU 112 operates in accordance with a graph data distributed administration management program to function as the graph data distributed administration manager 131. The same applies to the other programs. Furthermore, the CPU 112 operates as function modules for performing a plurality of processes executed by each program. The computers and the computer system are apparatuses and a system including these function modules.

The information such as programs and tables for implementing the functions of the graph data distributed administration manager 131 and the graph data distributed search manager 132 can be stored in a storage device such as the storage area 114, a non-volatile semiconductor memory, a hard disk drive, or an SSD (Solid State Drive), or a computer-readable non-transitory data storage medium such as an IC card, an SD card, or a DVD.

Programs to be run on each search execution computer 102 for providing distributed administration and search of graphs are described. The CPU 52 of the search execution computer 102 loads a program 71 and data 72 stored in the storage device 54 to the memory 51 and executes the program 71. The program 71 includes a query execution module 60. The query execution module 60 conducts a search of the graphs 70 with search conditions received from the management computer 101 and returns a search result to the management computer 101. The storage device 54 stores the program 71, and in addition, it functions as a storage module for storing graphs and further, stores an index of the graphs 70 as data 72.

The client 80 is a computer including a CPU, a memory, a communication device, an input device, and an output device, which are not shown, and sends search conditions (or a search query) as a request for search to the management computer 101.

Figure 2:
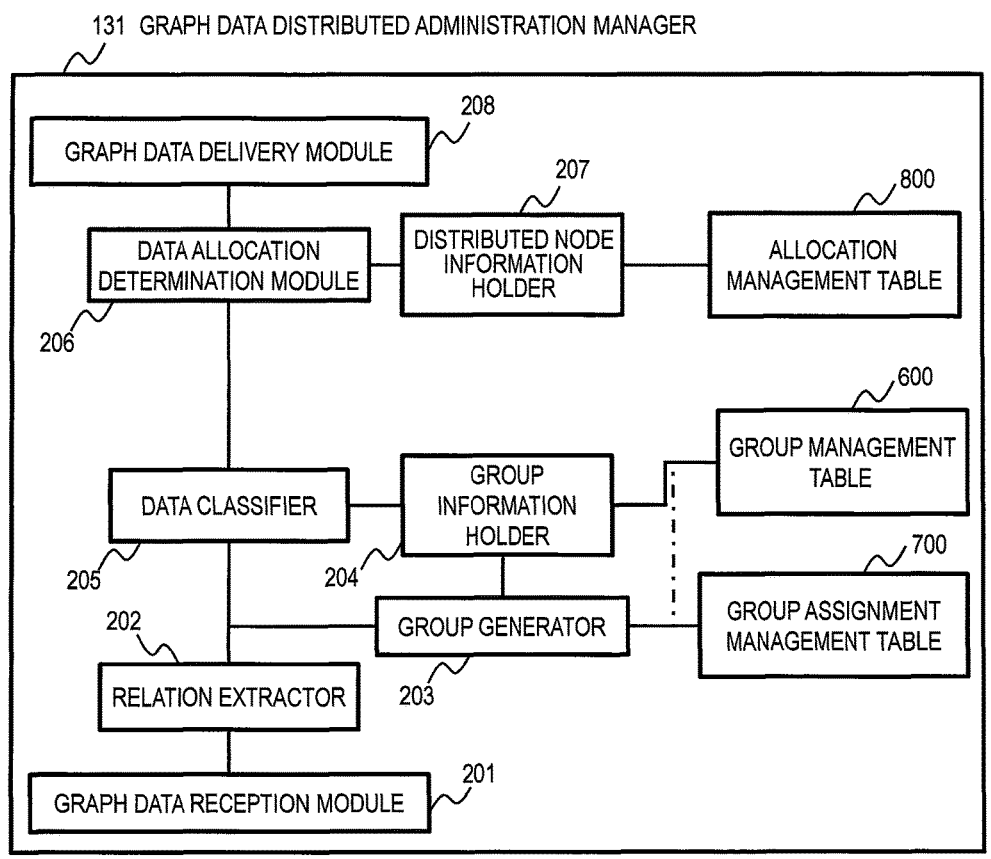
FIG. 2 is a block diagram illustrating function modules included in the graph data distributed administration manager according to the first embodiment of this invention.

FIG. 2 is a block diagram illustrating function modules included in the graph data distributed administration manager 131, which is a program to be loaded to the memory 111 of the management computer 101 and executed to implement distributed administration of graphs.

The program to be executed for the management computer 101 to function as a graph data distributed administration manager includes a graph data reception module 201, a relation extractor 202, a group creator 203, a group information holder 204, a data classifier 205, a data allocation determination module 206, a distributed node information holder 207, a graph data delivery module 208, and later-described tables.

Figure 22:
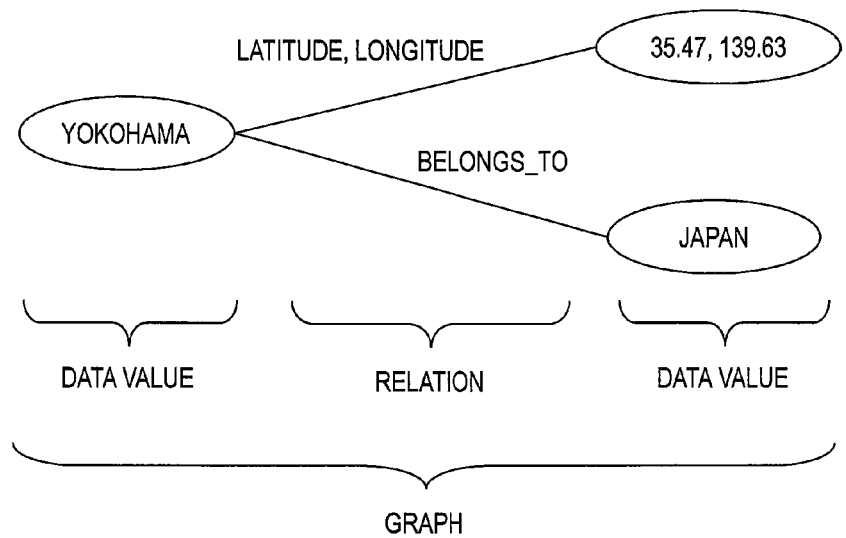
FIG. 22 is a diagram illustrating an example of graphs to apply this invention.

The graph data reception module 201 receives graphs to be managed through the input device 115 and the communication device 113. The relation extractor 202 extracts data relations included in each of the received graphs. In this description, a graph is a set of data or data pieces connected by relations; for example, as shown in FIG. 22, a data piece of a city name has relations such as locational information (latitude and longitude) and belongingness (country) and is connected by the relations to form a set of data. The graph in FIG. 22 indicates that a data value of a city name "YOKOHAMA" is connected with a data value of a country name "JAPAN" by a relation of "BELONGS_TO". Also, the data value of the city name "YOKOHMA" is connected with a data value "35.47, 139.63" by a relation of "LATITUDE, LONGITUDE". The relation extractor 202 extracts these relations connecting data pieces.

The group creator 203 creates graph groups each including extracted data relations as elements and manages the IDs of the created groups with the relations of the elements by group in a group management table 600. That is to say, the group creator 203 treats one or more relations different in elements as a different group and adds a new entry to the group management table 600 when a new group is created. The group management table 600 is held in the memory 111 by the group information holder 204. FIG. 6 is a view illustrating an example of the group management table 600. In the group management table 600, an entry (or a record) includes a group ID 601 for storing the identifier of a graph group and a relation list 602 for storing elements indicating data relations.

The data classifier 205 identifies, with reference to the group information (group management table 600) held by the group information holder 204, a group (group ID 601) including elements identical to the data relations included in the received graph as a group to include the graph and manages it in a group assignment management table 700.

FIG. 7 is a view illustrating an example of the group assignment management table 700. In the group assignment management table 700, an entry (or a record) includes a graph ID 701 for storing the identifier of a graph and a group ID 702 for storing a group ID 601 in the group management table 600.

The data allocation determination module 206 selects a search execution computer 102 having the fewest graphs assigned the group ID 801 identical to the group ID identified for the graph.

That is to say, the data allocation determination module 206 selects, with reference to the allocation management table 800 illustrated in FIG. 8, a search execution computer indicating the fewest (or fewer) number in the numbers of allocated graphs 802-1 to 802-n among the search execution computers 102-1 to 102-n for the group ID 801 identical to the group ID 601 identified with FIG. 6.

The data allocation determination module 206 determines to allocate the graph provided with a graph ID 701 to the selected execution computer 102.

The distributed node information holder 207 holds information on assigned groups for the data allocation determination module 206 to determine where to allocate a graph. FIG. 8 is a view illustrating an example of the allocation management table 800 for holding information on assigned groups. The allocation management table 800 holds the numbers of graphs stored in individual search execution computers 102 by group as the information on assigned groups.

The allocation management table 800 includes group IDs 801 for storing the identifiers of graph groups and the numbers of graph IDs associated in FIG. 7 as the numbers of graphs 802-1 to 802-n allocated to the search execution computers 102-1 to 102-n.

The graph data delivery module 208 delivers a graph 70 to the determined search execution computer 102 using the communication device 53. The search execution computer 102 stores the received graph 70 into the storage device 54.

Figure 4:
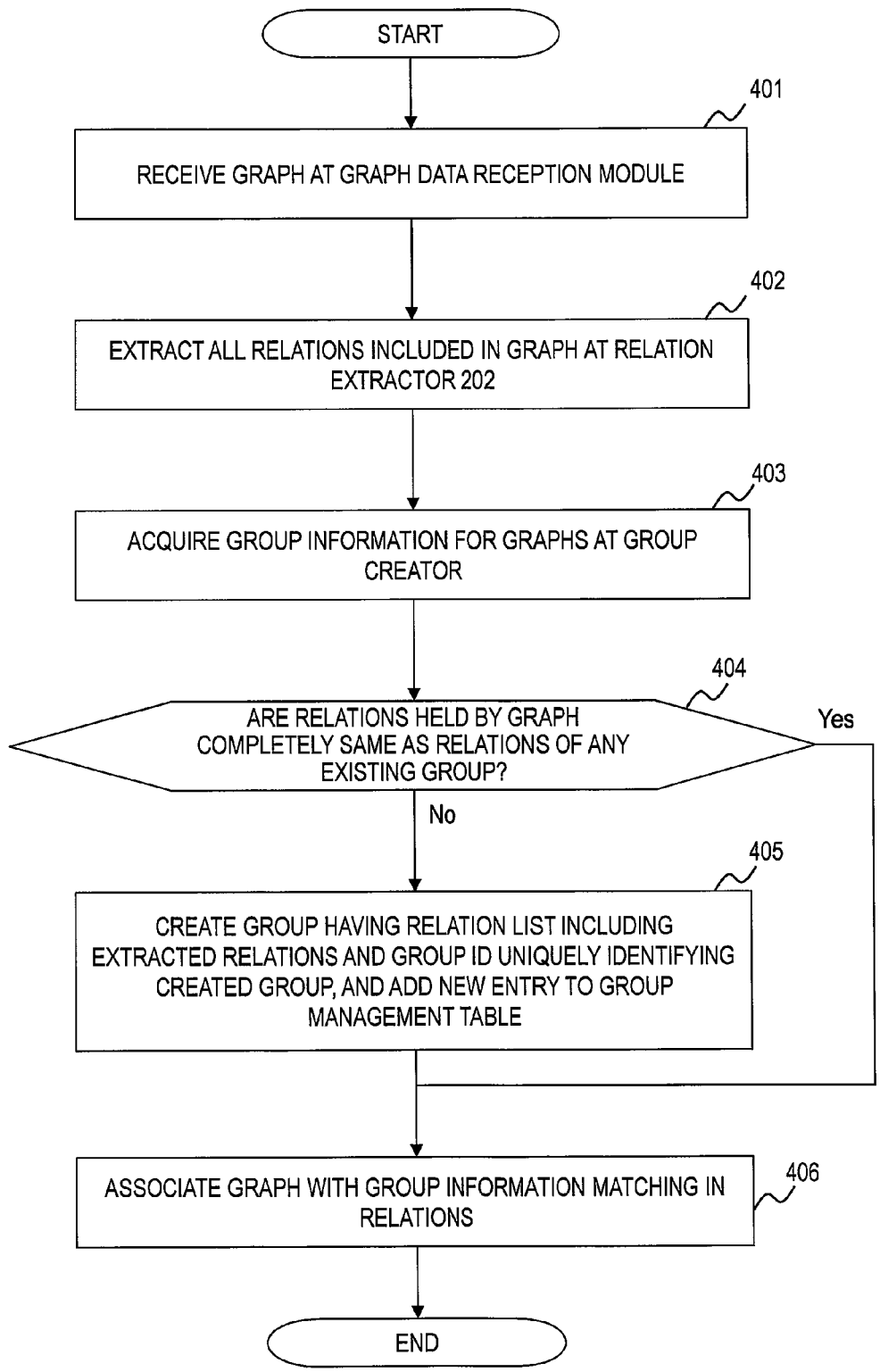
FIG. 4 is a flowchart illustrating an example of classifying a graph into a group, which is performed in the graph data distributed administration manager according to the first embodiment of this invention.

FIG. 4 is a flowchart illustrating an example of classifying a graph into a group, which is performed in the graph data distributed administration manager 131. The processing to classify a received graph into a group is described in accordance with the flowchart illustrated in FIG. 4. The processing in FIG. 4 is performed using the graph data reception module 201, the relation extractor 202, the group creator 203, the group information holder 204, and the data classifier 205 among the function modules included in the graph data distributed administration manager 131.

First, the graph data reception module 201 receives a graph through the communication device 113 of the management computer 101 (Step 401) and sends it to the relation extractor 202. The relation extractor 202 extracts all the data relations included in the received graph and sends them to the group creator 203 (Step 402).

The group creator 203 acquires the group management table 600 from the group information holder 204 and determines whether any group ID 601 exists with which the elements of relations included in the acquired relation list 602 are completely the same as all the relations extracted by the relation extractor 202.

If a matching group ID 601 exists, the group creator 203 creates a graph ID 701 for uniquely identifying the received graph and adds a new entry to the group assignment management table 700 so as to associate the graph ID 701 with the group ID 702 in one-to-one correspondence (Step 406).

If no matching group ID 601 exists in the determination at the foregoing Step 404, the group creator 203 proceeds to Step 405. The group creator 203 creates a group including all the relations extracted by the relation extractor 202 in a relation list 602 and a group ID 601 for uniquely identifying this group and adds a new entry to the group management table 600 (Step 405).

Subsequently, like in the case where a matching group ID 601 exists, the group creator 203 creates a graph ID 701 for uniquely identifying the received graph and adds a new entry to the group assignment management table 700 so as to associate the graph ID 701 with the group ID 702 in one-to-one correspondence.

Through the above-described processing, a graph received by the management computer 101 is assigned a group ID 702 of the graph group having the identical relation list 602, if such a group exists, and is managed in the group management table 600 and the group assignment management table 700.

Figure 5:
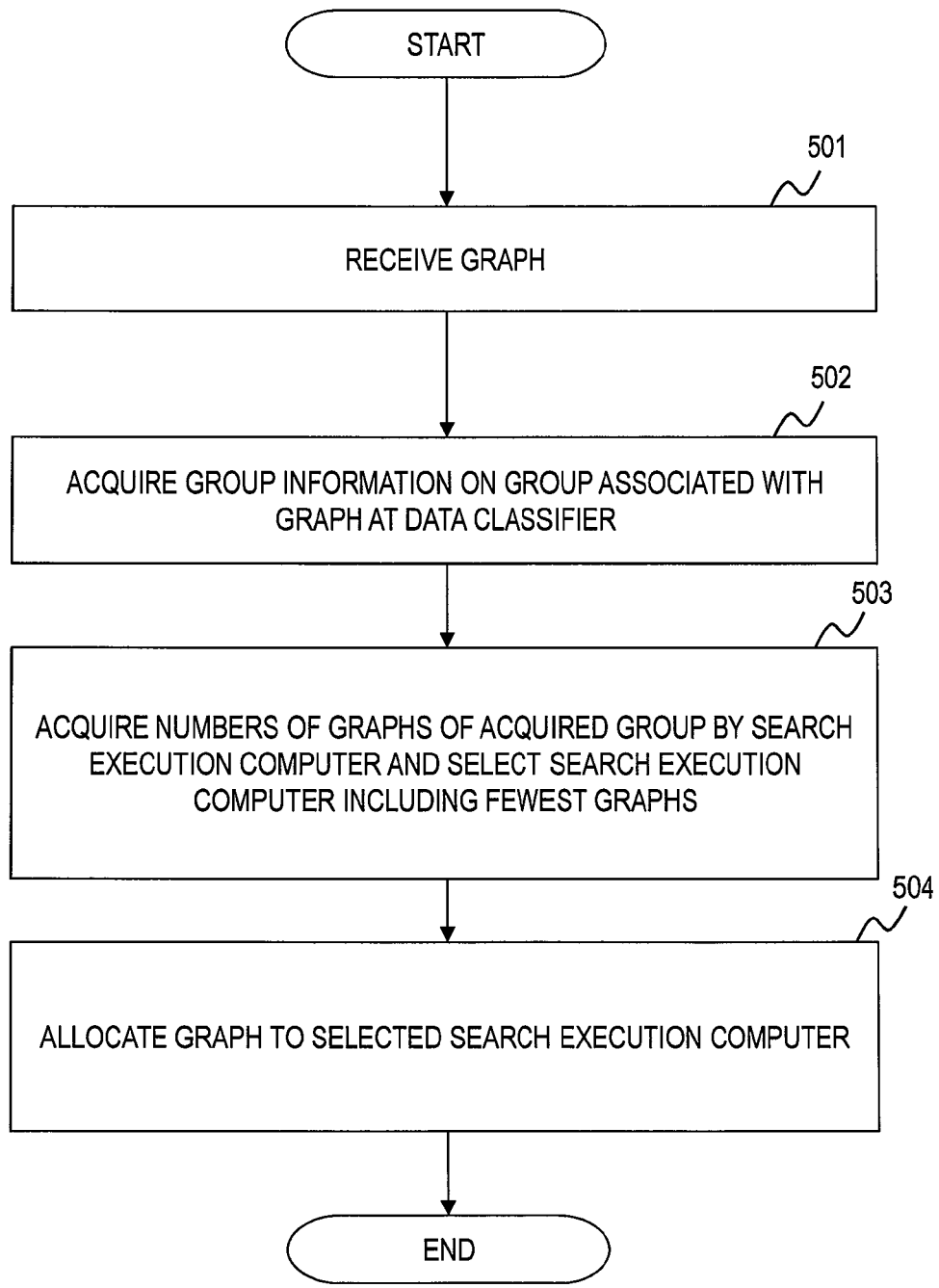
FIG. 5 is a flowchart illustrating an example of allocating a graph, which is performed in the graph data distributed administration manager

FIG. 5 is a flowchart illustrating an example of allocating a graph, which is performed in the graph data distributed administration manager 131. The processing is performed using the graph data reception module 201, the group information holder 204, the data classifier 205, the data allocation determination module 206, the distributed node information holder 207, and the graph data delivery module 208 of the graph data distributed administration manager 131. This processing is to deliver a graph to a search execution computer 102 so that the graphs assigned the same group will be equally distributed among the search execution computers 102.

First, the graph data reception module 201 receives a graph and sends it to the data classifier 205 (Step 501). It should be noted that the graph sent to the data classifier 205 at this phase may be the one sent by the group creator 203 after creating a graph group in accordance with the foregoing flowchart of FIG. 4. If the foregoing processing in FIG. 4 needs to create a graph group, the received graph may be temporarily stored in the memory, the storage device, or an external storage device to be used again.

The data classifier 205 refers to the group assignment management table 700 from the group information holder 204, acquires the group ID 702 of the group the received graph belongs to, and sends the graph to the data allocation determination module 206 together with the group ID 702 (Step 502).

The data allocation determination module 206 acquires the allocation management table 800 from the distributed node information holder 207 and determines whether any group ID 801 identical to the received group ID 702 exists. If a group ID 801 identical to the group ID 702 exists, the data allocation determination module 206 extracts the search execution computer indicating the fewest allocated graphs among the numbers of allocated graphs 802-1 to 802-n in the search execution computer 102-1, the search execution computer 102-2, . . . and the search execution computer 102-n. The data allocation determination module 206 sends the received graph to the graph data delivery module together with the locational information on the extracted search execution computer and adds 1 to the number of allocated graphs in the search execution computer 102 of the destination (Step 503).

If a plurality of search execution computers 102 indicate the fewest allocated graphs, the data allocation determination module 206 may select a search execution computer 102 at random or may select the search execution computer 102 having the fewest allocated graphs found first or last. As the locational information on the search execution computer 102, an IP address indicating locational information in the network or an ID uniquely identifying a search execution computer may be used.

At the end, the graph data delivery module 208 sends the received graph to the search execution computer 102 at the locational information designated by the data allocation determination module 206 (Step 504).

Through the above-described processing, the management computer 101 extracts a group ID 801 of the received graph, selects a search execution computer 102 indicating the fewest allocated graphs of the same group ID 801 in the allocation management table 800, and delivers the graph 70 to the selected search execution computer 102.

The management computer 101 functions as the aforementioned graph data distributed administration manager to distribute and store graphs to search execution computers 102. The management computer 101 also functions as a graph data distributed search manager implemented by the graph data distributed search manager 132 run on the memory of the management computer 101 in searching the graphs stored in the search execution computers 102 for a desired graph.

Figure 3:
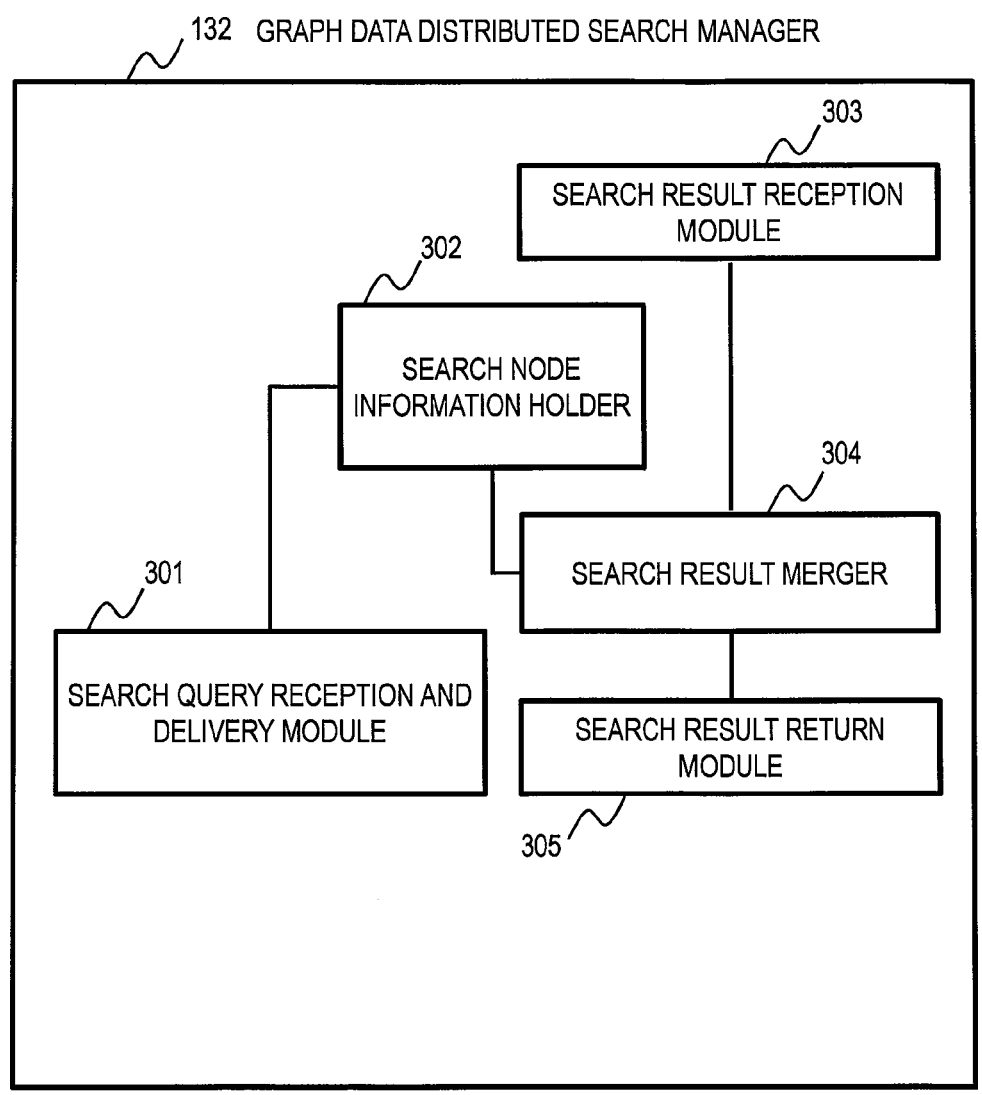
FIG. 3 is a block diagram illustrating examples of function modules in the graph data distributed search manager.

FIG. 3 is a block diagram illustrating examples of function modules in the graph data distributed search manager 132.

The management computer 101 functioning as the graph data distributed search manager transfers search conditions sent from the client 80 requesting a search and received at a search query reception and delivery module 301 through the communication device 113 to each search execution computer 102 through the communication device 113. Simultaneously, the management computer 101 records the search execution computers 102 of the destinations to deliver the search conditions in a search node information holder 302. The client 80 issues a search query (hereinafter, search conditions) as a request for search.

Each of the search execution computers 102 which have received the search conditions interprets the search conditions at the query execution module 60, extracts possible solutions using index data held in its storage device 54 as a kind of data, and holds the extracted possible solutions in a possible solution holder 61. Thereafter, the query execution module 60 of the search execution computer 102 extracts a graph 70 matching the search conditions from the possible solutions and sends the extracted graph to the management computer 101. If no graph matching the search conditions exists, the search execution computer 102 sends information indicating that no matching data exists to the management computer 101.

Figure 23:
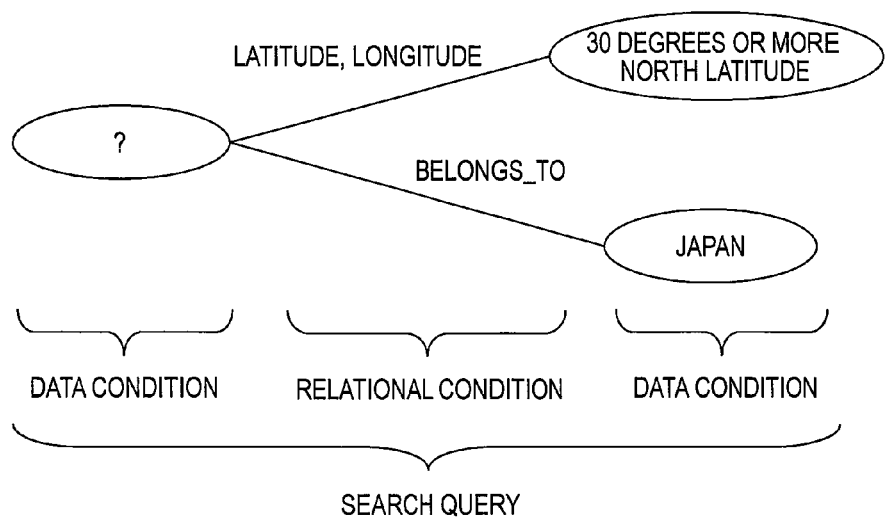
FIG. 23 is a diagram illustrating an example of a search query to apply this invention.

The search conditions include data conditions and relational conditions as illustrated in FIG. 23. FIG. 23 is a diagram illustrating an example of a search query to apply this invention. The example in FIG. 23 indicates search conditions including data conditions of a relational condition "BELONGS_TO" and a data condition "JAPAN", and a relational condition "LATITUDE, LONGITUDE" and a data condition "30 degrees or more north latitude". In this example, solutions to the data conditions "BELONGS_TO" and "JAPAN" can be obtained through index searching; however, solutions to the data condition "30 degrees or more north latitude" are extracted from the possible solutions obtained by the index searching through condition matching.

A search result reception module 303 of the management computer 101 receives search results sent back from the search execution computers 102 and transfers them to a search result merger 304. The search result merger 304 waits for the search results sent back from all the search execution computers 102 to which the search conditions have been sent and recorded in the search node information holder 302. The search result merger 304 joins the graphs sent back from all the search execution computers 102 into one set of data and sends it to the client 80 that has issued the search conditions using the search result return module 305.

The above-described distributed administration and distributed search of graphs provide a method for distributed administration of graphs, which are sets of data in which a data piece holds a data value and relations with other data pieces and is connected by the relations. The method creates graph groups having the same data relations and equally allocates the graphs of the same group to a plurality of search execution computers 102. Such distributed administration of graphs among a plurality of search execution computers 102 enables, in searching the graphs including identical data relations, the search execution computers 102 to have equal numbers of graphs to be searched, achieving load balancing among the search execution computers 102.

The foregoing Embodiment 1 has provided an example that the computer system for providing distributed administration and distributed search of graphs is composed of a management computer 101 and a plurality of search execution computers 102; however, the configuration is not limited to this. For example, a physical computer having multiple processors can configure a plurality of virtual machines with a hypervisor or a VMM (virtual machine monitor) so that one of the virtual machines will operate as a management computer 101 and the other virtual machines will operate as search execution computers 102.

Embodiment 2

In searching graphs 70 distributed among search execution computers 102, the query execution module 60 in each search execution computer 102 extracts possible solutions using dictionary data included in an index held in the storage device 54. The query execution module 60 then determines whether each data value and data relation included in all the graphs of the possible solutions matches search conditions. Embodiment 2 uses a computer system having the same configuration as that of Embodiment 1 to perform distributed administration and distributed search of graphs. It is also assumed that the index and later-described dictionary data in the storage device 54 are included in, for example, data 72.

Each record of the dictionary data used in searching at the search execution computer 102 includes a data value or a data relation included in the graphs 70 in the form of a character string, a numeric sequence, or a symbol string. Sorting these records by the value like a dictionary helps the query execution module 60 to narrow down the range of data value in the graphs matching search conditions to extract possible solutions The information included in a record of data can be classified as either one of the following two types. One is class information indicating the type or category of a data piece, which may be expressed as a URI (uniform resource identifier) or a word. The other is information indicating the meaning of a data piece itself (hereinafter, instance information), which may be expressed as a sentence, one of a symbol string, a numeric sequence, and a numerical value in accordance with some schema, or a combination of these.

The former class information is frequently used to narrow down the data to be retrieved with a type or a category. The latter instance information is used in (possible) condition matching which is conducted, after extraction of possible solutions, to determine whether the extracted data includes desired information or whether the extracted data is included in a specified range. Specifically, the condition matching in this description is to determine whether a partial character string included in a data value or a numerical sequence included in a data value is greater or smaller than a specified value (data condition), or whether the date and time included in a data value is before or after a specified date and time (data condition).

The data relations included in a graph are a kind of type or category of a data piece; accordingly, they belong to the former class information. As to the data values, if the data value has information of a type or category, it belongs to the former class information; in the other cases, it belongs to the latter instance information.

Taking the graph illustrated in FIG. 22 as an example, a data value of a city name "YOKOHAMA" and a data value of a country name "JAPAN" is connected by a category "BELONGS_TO" to construct a relation. In conducting a search, the relation "BELONGS_TO" can classify data values to be searched with an index. That is to say, data values a category "BELONGS_TO" connects to are class information.

In contrast, the data value of a numerical sequence "35.47, 139.63" is instance information indicating the coordinates of a city name "YOKOHAMA". The data value of the numerical sequence "35.47, 139.63" is more likely to be retrieved with a data condition of a range in latitude or longitude. Embodiment 2 creates a graph group with a relation "LATITUDE, LONGITUDE" connecting a city name "YOKOHAMA" with a numerical sequence "35.47, 139.63" and equally distributes the graphs of the group to a plurality of search execution computers 102 to achieve load balancing in searching of condition matching. However, Embodiment 2 does not create a group with a relation "BELONGS_TO" since a country name connected with a city name by the relation "BELONGS_TO" is class information. This is because, since a data value connected by a relation "BELONGS_TO" is class information, index searching can extract a solution, so that the search execution computers 102 are less affected in load.

In searching graphs, the query execution module 60 of a search execution computer 102 extracts data values matching a data condition of aforementioned class information using an index created in advance. Subsequently, the query execution module 60 determines whether each of the data values satisfies a data condition (and a relational condition) on instance information to find a data value satisfying the relational condition.

For example, as illustrated in FIG. 23, the query execution module 60 conducts a search using an index with a data value indicating a category "JAPAN" as a data condition of the search conditions (a data condition and a relational condition) to extract possible solutions of city names. Subsequently, the query execution module 60 extracts numerical sequences satisfying a relational condition "North Latitude" and a data condition "30 degrees or more" through condition matching to obtain search results.

The computer system to perform distributed searching equally distributes the number of times of conducting condition matching to the plurality of search execution computers 102 to achieve substantial load balancing among the search execution computers 102 in searching.

To equally distribute the number of times of conducting condition matching to a plurality of search execution computers 102, Embodiment 2 classifies graphs including common data relations connecting to values of instance information on which the aforementioned condition matching is to be conducted into the same group in classifying graphs to be extracted as possible solutions in searches into the same group. Embodiment 2 further provides a method for distributed administration of graphs that equally distributes and allocates graphs included in the same group to the search execution computers 102. That is to say, taking the graph in FIG. 22 as an example, Embodiment 2 creates a group of graphs with the relation "LATITUDE, LONGITUDE" connecting the data value of a numerical sequence "35.47, 139.63" with a city name.

Embodiment 2 performs the above-described processing using the graph data reception module 201, the relation extractor 202, the group creator 203, the group information holder 204, and the data classifier 205 included in the graph data distributed administration manager 131 illustrated in FIG. 2 of the foregoing Embodiment 1.

Figure 9:
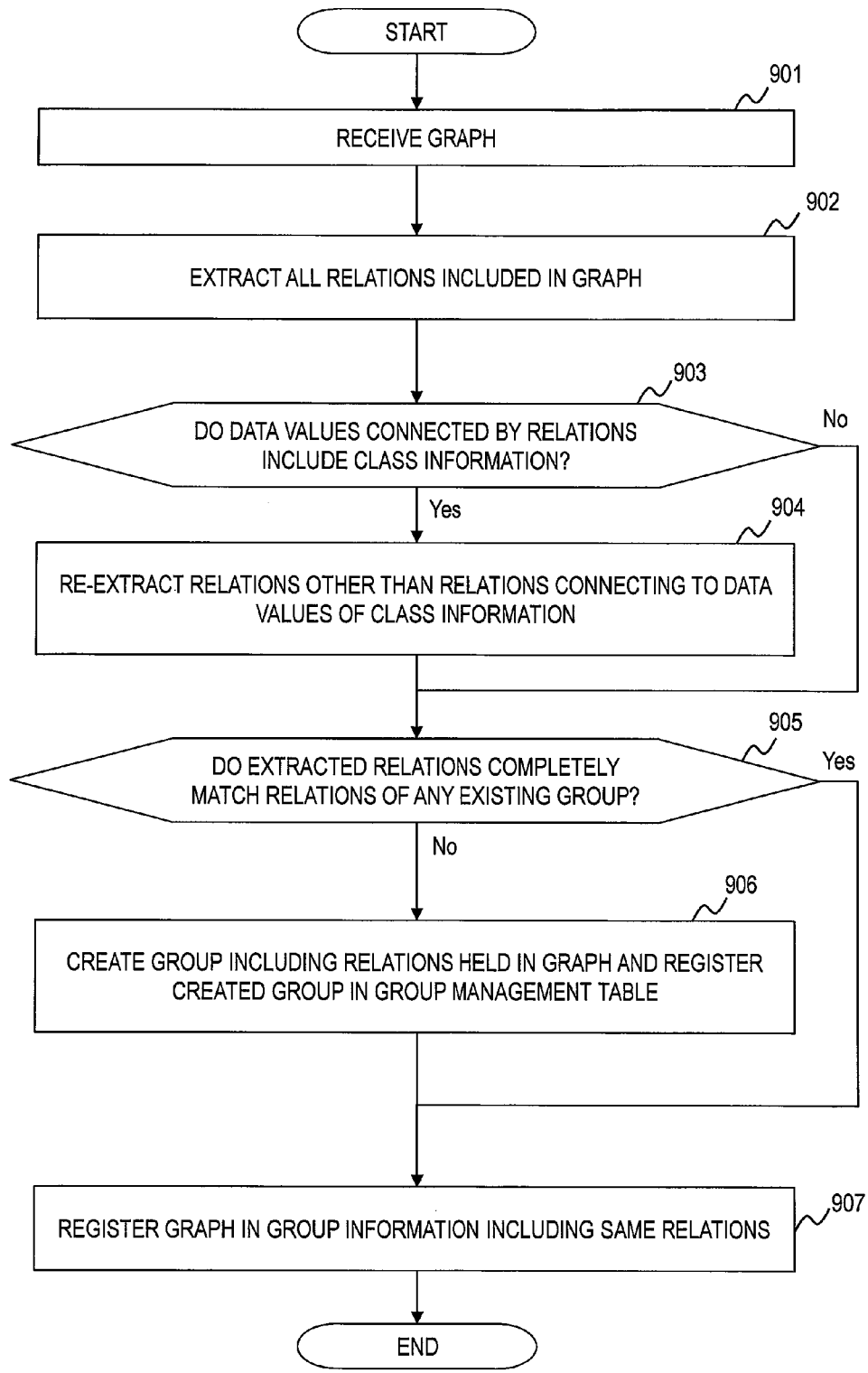
FIG. 9 is a flowchart illustrating an example of processing for the management computer according to a second embodiment of this invention.

FIG. 9 is a flowchart illustrating an example of processing for the management computer 101 to classify a graph into a group including identical relations connecting to data values on which condition matching is more likely to be conducted after some graphs are extracted as possible solutions.

First, the graph data reception module 201 receives a graph through the communication device 113 of the management computer 101 (Step 901) and sends it to the relation extractor 202. The relation extractor extracts data relations included in the received graph and sends them to the group creator (Step 902).

The group creator 203 determines, on each of the received relations, whether the data value the received relation connects to is class information indicating the type or the category of a data piece, such as information indicated by a URI (Step 903). If class information is included, the group creator 203 proceeds to Step 904; if no class information is included, it proceeds to Step 905.

At Step 904, the group creator 203 removes the relations connecting to data values of class information extracted at Step 902 from the extracted relations. That is to say, it re-extracts relations connecting to data values of instance information.

At Step 905, the group creator 203 acquires the group management table 600 from the group information holder 204 and determines whether any graph group ID exists with which all the relations included in a relation list 602 completely match the extracted relations.

If a graph group ID including a complete match exists, the group creator 203 proceeds to Step 907. It creates a graph ID 701 for uniquely identifying the received graph and adds a new entry to the group assignment management table 700 so as to associate the graph ID 701 with the group ID 702 in one-to-one correspondence.

If no graph group ID including a complete match exists, the group creator 203 proceeds to Step 906. It creates a group including all the extracted relations in a relation list 602 and a group ID 601 for uniquely identifying this group and adds a new entry to the group management table 600.

After adding a new entry to the group management table 600 at Step 906, the group creator 203 proceeds to the above-described Step 907. The group creator 203 creates a graph ID 701 for uniquely identifying the received graph and adds a new entry to the group assignment management table 700 so as to associate the graph ID 701 with the group ID 702 in one-to-one correspondence.

Through the above-described processing, the management computer 101 can provide a graph data distributed administration method that creates a group of graphs on which condition matching is to be conducted with data conditions of search conditions on data value after extraction of possible solutions with the same search conditions and equally allocates graphs included in the same group to the search execution computers 102.

Such distributed administration of graphs among a plurality of search execution computers 102 achieves equal number of times of conducting condition matching among the search execution computers 102.

Embodiment 3

Embodiment 2 creates a group of graphs on which condition matching is to be conducted and distributes the graphs included in the same group equally to a plurality of search execution computers 102.

In conducting an actual search, even though data values are not class information indicating the types or categories of data pieces but they are instance information indicating the meanings of data pieces, some data values are more likely to be objects of condition matching and some data values are less likely to be objects of condition matching. In view of this circumstance, Embodiment 3 stores search conditions (search query) of the searches conducted by the search execution computers 102 and, in consideration of the past search conditions, creates a group of graphs including common relations connecting to data values on which condition matching is more frequently conducted. Then, Embodiment 3 distributes the graphs of the same group equally to a plurality of search execution computers 102 to distribute possible solutions to be extracted by distributed searching to the plurality of search execution computers 102, increasing the possibility of achieving load balancing in searching.

To achieve load balancing in searching, Embodiment 3 classifies graphs including common data relations connecting to data values that have frequently been objects of condition matching in the past searches into the same group in classifying graphs to be extracted in searches as possible solutions into the same group. Then, Embodiment 3 distributes and allocates graphs of the same group equally to the search execution computers 102 to achieve load balancing in searching.

The system configuration of Embodiment 3 is provided by adding a relation retrieval count management table 721 to the data 72 in each search execution computer 102 illustrated in FIG. 1 of Embodiment 1; the rest of the configuration is the same as that of Embodiment 1. The common elements are denoted by the same reference signs and explanation thereof is omitted.

Figure 13:
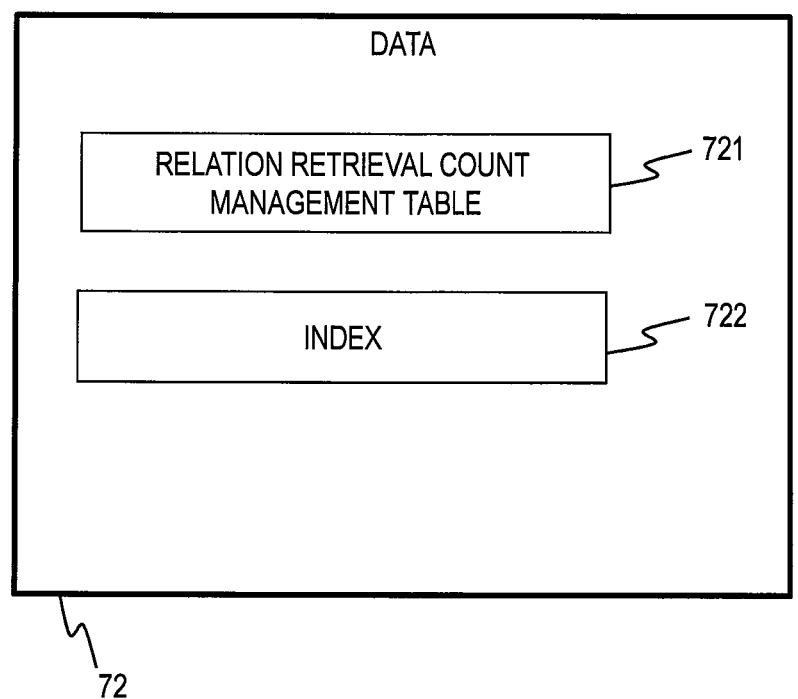
FIG. 13 is a block diagram illustrating an example of data stored in the storage device of each search execution computer according to the third embodiment of this invention.

FIG. 13 is a block diagram illustrating an example of data 72 stored in the storage device 51 of each search execution computer 102. The data 72 includes an index 722 and a relation retrieval count management table 721 for recording the number of searches by the kind of relation.

FIG. 11 is a view illustrating an example of the relation retrieval count management table 721. In the relation retrieval count management table 721, each entry includes a retrieved relation 7211 for storing a retrieved relation and a relation retrieval count 7212 for storing the count of retrieval of the relation.

Figure 10:
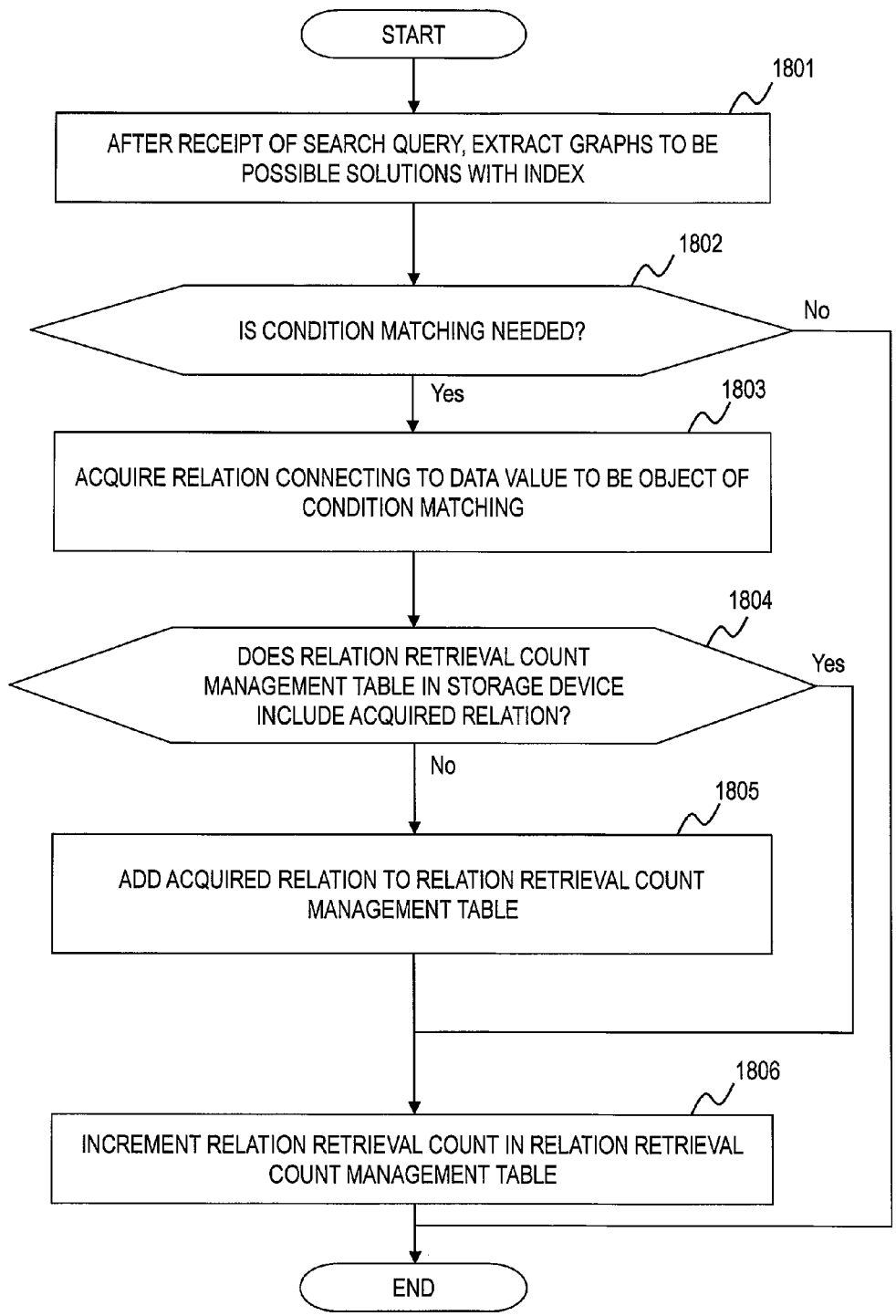
FIG. 10 is a flowchart illustrating an example of processing of the query execution module according to a third embodiment of this invention.

FIG. 10 is a flowchart illustrating an example of processing of the query execution module 60 in each search execution computer 102 shown in FIG. 1 of Embodiment 1 to store a relation connecting to a data value to be an object of condition matching.

First, upon receipt of a search query from the management computer 101, the query execution module 60 extracts graphs 70 to be possible solutions with an index (Step 1801). It is assumed that the index is the same as the one in Embodiment 2 and included in the data 72 in the storage device 54.

Then, the query execution module 60 determines whether condition matching needs to be conducted on the extracted possible solutions (Step 1802). If condition matching is necessary, the query execution module 60 acquires a relation connecting to the data value to be an object of the condition matching from the management computer 101 (Step 1803).

Subsequently, the query execution module 60 determines whether the relation acquired at Step 1803 is included in the retrieved relations 7211 in the relation retrieval count management table 721 shown in FIG. 11 held in the data 72 of the storage device 54 (Step 1804). If the acquired relation is included in the retrieved relations 7211, the query execution module 60 proceeds to Step 1806. If the acquired relation is not included in the retrieved relations 7211, the query execution module 60 includes the acquired relation into a new entry of retrieved relation 7211 of the relation search count management table 720, sets an initial value 0 to the retrieval search count 7012, and proceeds to Step 1806 (Step 1805).

At Step 1806, the query execution module 60 increments the relation search count 7212 for the acquired relation by one. Thereafter, it proceeds to condition matching.

Although this description has provided an example that the relation retrieval count management table 721 in FIG. 11 is held as data in the storage device 54 of each search execution computer 102, this table may be sent to the management computer 101 with predetermined timing to be held in the storage device 114 of the management computer 101.

Figure 12:
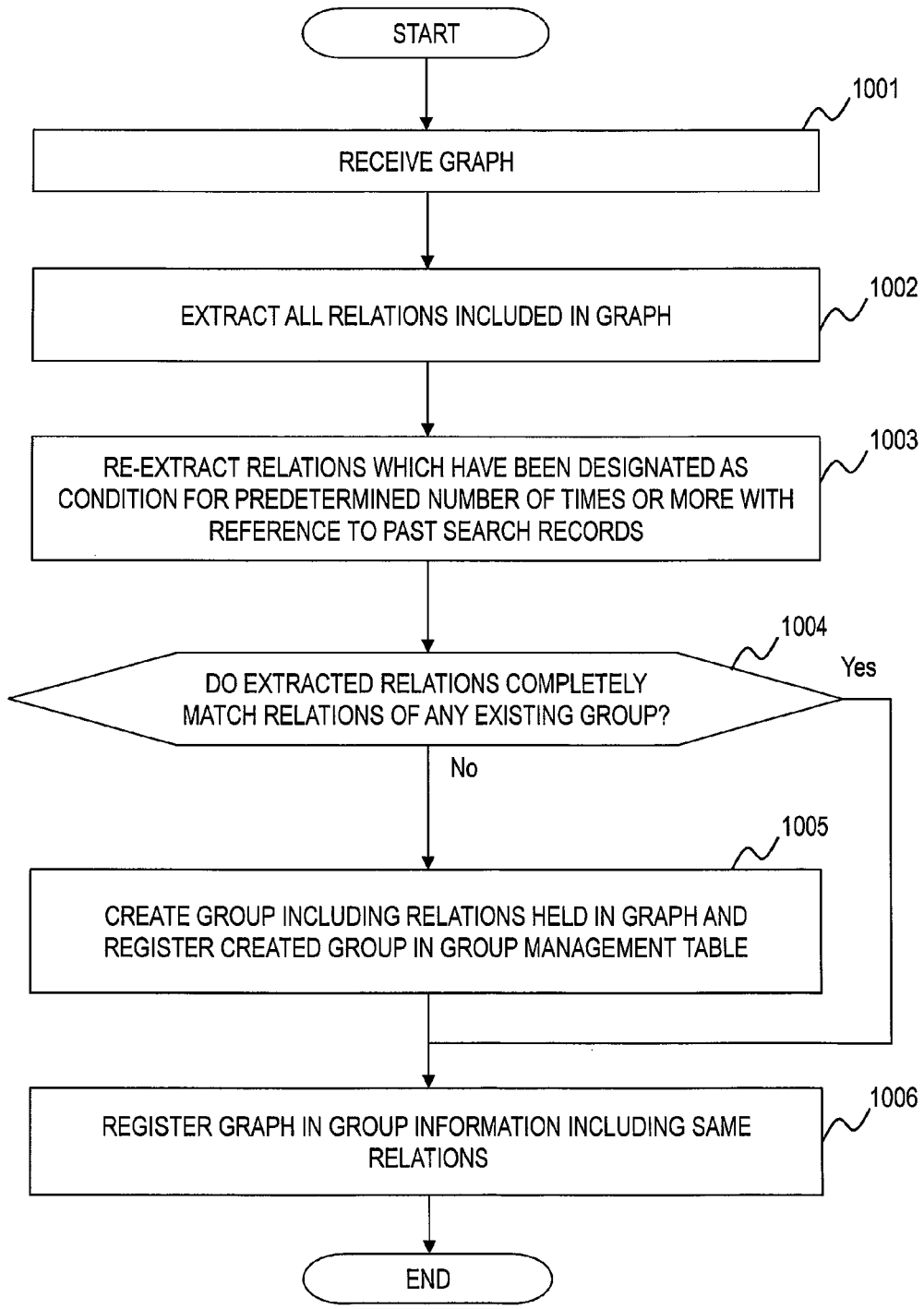
FIG. 12 is a flowchart illustrating an example of processing of the graph data distributed administration manager to extract relations to be used to create a group from statistical information according to the third embodiment of this invention.

FIG. 12 is a flowchart illustrating an example of processing of the graph data distributed administration manager to extract relations to be used to create a group from statistical information. The processing of the flowchart of FIG. 12 is performed in the management computer 101 using the relation retrieval count management table 721 created in accordance with the flowchart in FIG. 10 by the query execution module 60, and the graph data reception module 201, the relation extractor 202, the group creator 203, the group information holder 204, and the data classifier 205 included in the graph data distributed administration manager 131 shown in FIG. 2, and the graph data distributed search manager 132 shown in FIG. 1.

First, in the management computer 101, the graph data reception module 201 receives a graph through the communication device 113 and sends it to the relation extractor 202 (Step 1001). The relation extractor 202 extracts data relations included in the received graph and sends them to the group creator 203 (Step 1002). The group creator 203 acquires the relation retrieval count management table 721 illustrated in FIG. 11 from the storage device 54 of each search execution computer 102 (or the storage device 114 of the management computer 101).

Then, the group creator 203 re-extracts relations which are included in the acquired relation retrieval count management tables 721 and indicate numbers greater than a predetermined threshold in the relation retrieval counts in the table from the relations extracted from the graph, and proceeds to Step 1004. The predetermined threshold may be a fixed value such as 1, a value input through the input device 115 of the management computer 101, or a number indicated in a specific row when sorting the relation retrieval counts in the relation retrieval count management table 721 in order of relation retrieval count.

At Step 1004, the group creator 203 acquires the group management table 600 from the group information holder 204 and determines whether the group management table 600 includes any graph group ID with which the relations included in a relation list 602 completely match the extracted relations.

If the group management table 600 includes a graph group ID with which the relations included in a relation list 602 completely match the extracted relations, the group creator 203 proceeds to Step 1006.

If no relation list 602 completely matching the extracted relations is found, the group creator 203 proceeds to Step 1005, creates a group including all the extracted relations in a relation list 602 and a group ID 601 for uniquely identifying the group, and adds them to the group management table 600 as a new entry (Step 1005).

Next, the group creator 203 creates a graph ID 701 for uniquely identifying the received graph and adds it to the group assignment management table 700 as a new entry so as to correspond to the group ID 702 one to one (Step 1006).

Through the above-described processing, a graph data distributed administration method can be provided that creates a group of graphs including common relations connecting to data values extracted as possible solutions for a threshold number of times or more in the past searches, and equally distributes and allocates graphs of the group to a plurality of search execution computers 102.

Such distributed administration of graphs can provide a graph data distributed search method that, if the foregoing relations are designated as search conditions in the same frequency as the past searches, equally extracts data values connected by the relations as possible solutions among the search execution computers 102.

Embodiment 4

When a data relation appearing in low frequency is designated as a search condition, the number of possible solutions is small. In contrast, when a relation appearing in higher frequency is designated as a search condition, the number of possible solution is greater. Accordingly, equally distributing graphs including relations appearing in high frequency to a plurality of search execution computers 102 leads to distribution of a large part of the load in searching, achieving more reduction in search time. Aiming at higher speed searching, Embodiment 4 provides a graph data distributed administration method that classifies graphs including common relations appearing in high frequency as the same group in classifying graphs extracted in searches as possible solutions into the same group, and equally distributes and allocates graphs included in the same group to the search execution computers 102.

The system configuration of Embodiment 4 is provided by adding a relation appearance count management table 900 illustrated in FIG. 15 to the graph data distributed administration manager 131 in the management computer 101 illustrated in FIG. 2 of Embodiment 1; the rest of the configuration is the same as that of Embodiment 1. The common elements are denoted by the same reference signs and explanation thereof is omitted.

Figure 17:
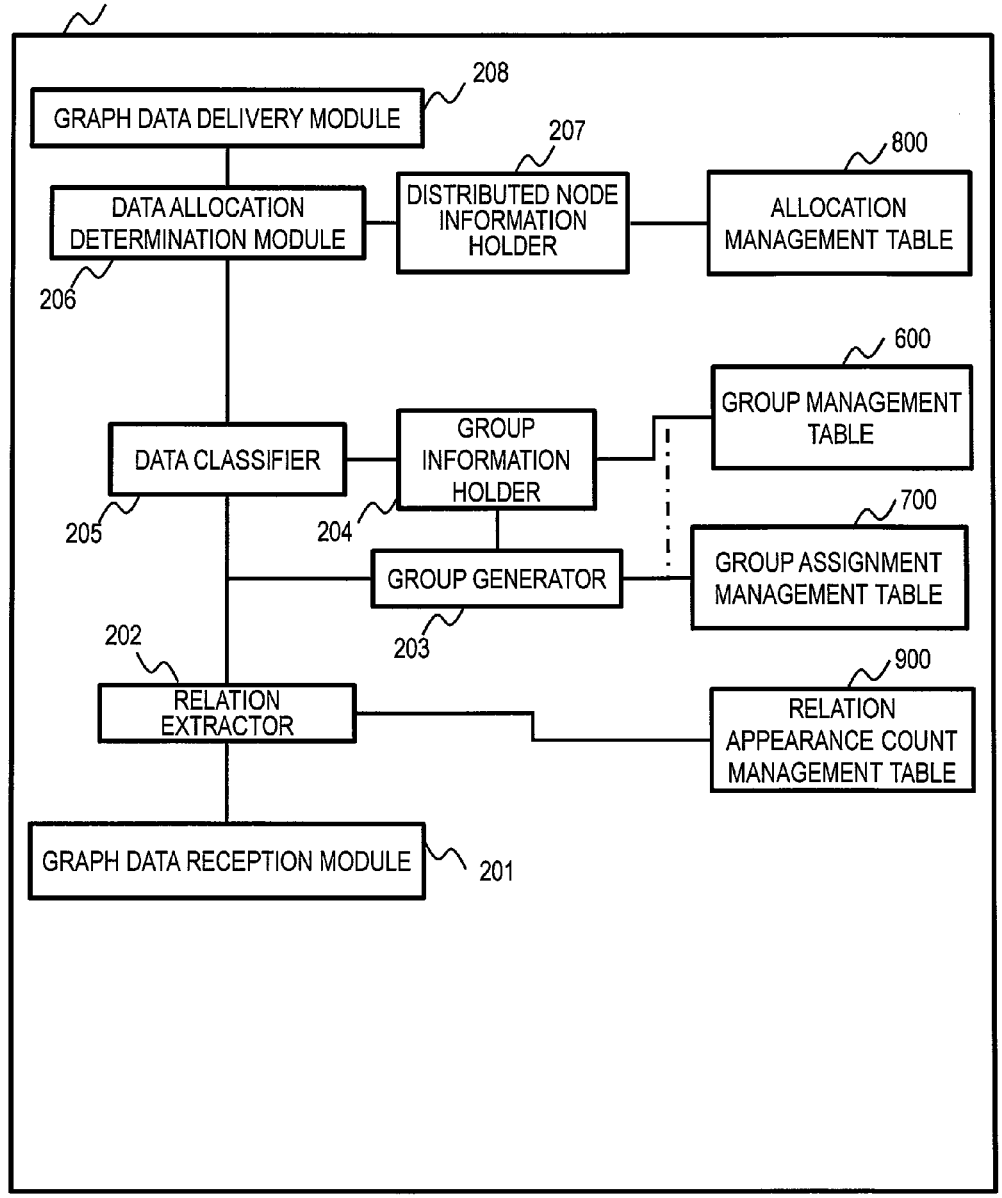
FIG. 17 is a block diagram illustrating a configuration of the graph data distributed administration manager according to the fourth embodiment of this invention.

FIG. 17 is a block diagram illustrating a configuration of the graph data distributed administration manager 131 in the management computer 101 in Embodiment 4. The graph data distributed administration manager 131 in Embodiment 4 additionally includes a relation appearance count management table 900 managed by the relation extractor 202. The rest of the configuration is the same as the configuration in Embodiment 1.

FIG. 15 is a view illustrating an example of the relation appearance count management table 900 in Embodiment 4 of this invention. In the relation appearance management table 900, an entry includes a relation 901 for storing a retrieved relation and an appearance count 902 for storing the number of times the relation has appeared.

Figure 14:
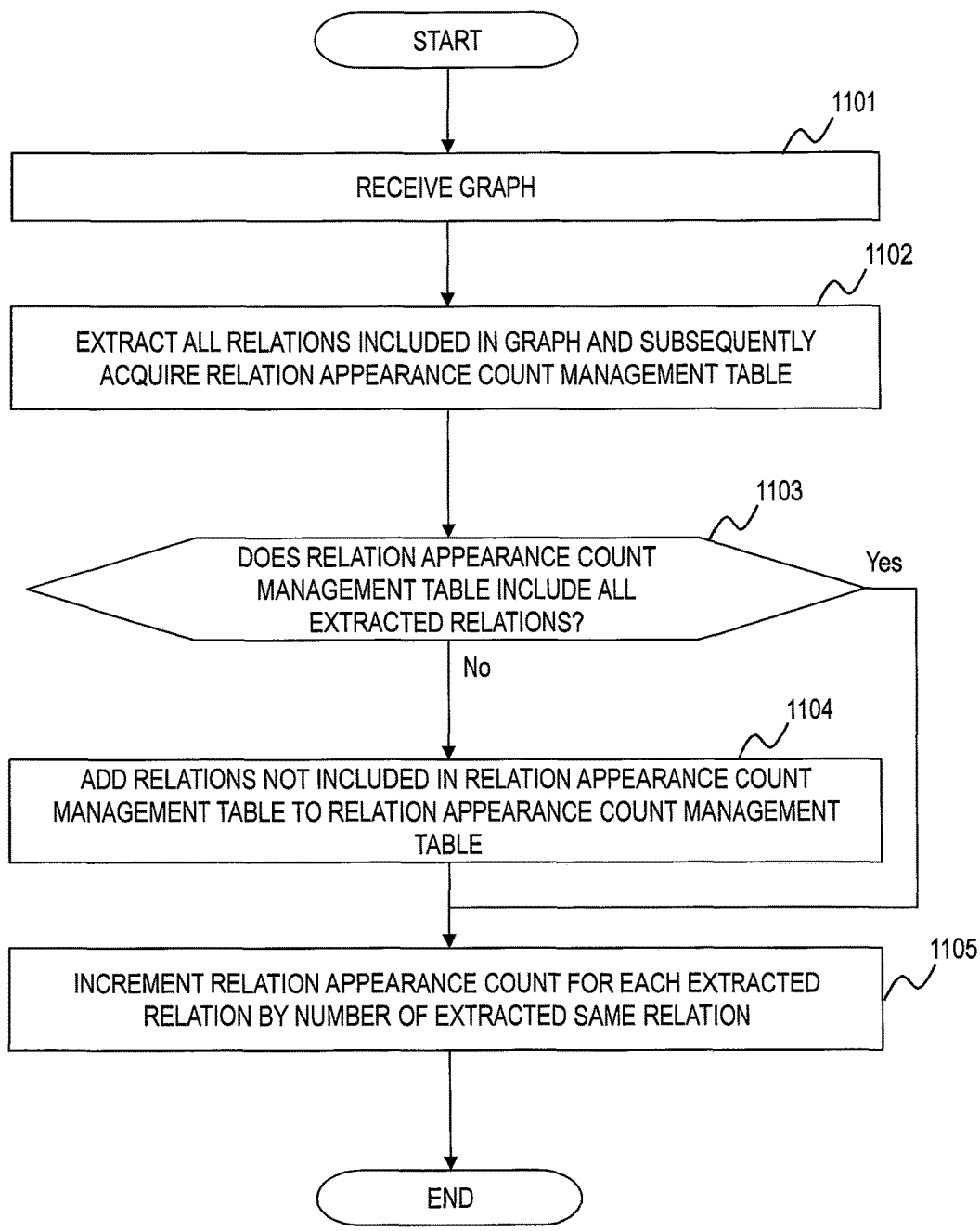
FIG. 14 is a flowchart illustrating an example of the graph data distributed administration manager to count the appearance of relations according to a fourth embodiment of this invention.

FIG. 14 is a flowchart illustrating an example of the graph data distributed administration manager 131 to count the appearance of relations. This processing extracts relations appearing at high frequency, using the graph data reception module 201 and the relation extractor 202 included in the graph data distributed administration manager 131.

First, in the management computer 101, the graph data reception module 201 receives a graph through the communication device 113 and sends it to the relation extractor 202 (Step 1101). The relation extractor 202 extracts data relations included in the received graph and then acquires the relation appearance count management table 900 shown in FIG. 15 from the storage device 114 (Step 1102). Subsequently, the relation extractor 202 determines whether all the extracted relations are included in the relation appearance count management table 900 (Step 1103).

If all the extracted relations are included in the relation appearance count management table 900, the relation extractor 202 proceeds to Step 1105; if one or more extracted relations are not included in the relation appearance count management table 900, it proceeds to Step 1104.

At Step 1104, the relation extractor 202 adds the relations which are not included in the relation appearance count management table 900 to the relation appearance count management table 900, sets the initial value 0 to the appearance counts, and proceeds to Step 1105. At Step 1105, the relation extractor 202 increments all the appearance counts for the extracted relations by one in the relation appearance count management table 900.

Using the relation appearance count management table 900 shown in

FIG. 15 created through the above-described processing, and the graph data reception module 201, the relation extractor 202, the group creator 203, the group information holder 204, and the data classifier 205 included in the graph data distributed administration manager 131 shown in FIG. 17, the management computer 101 classifies graphs into groups excluding relations appearing in low frequency.

Figure 16:
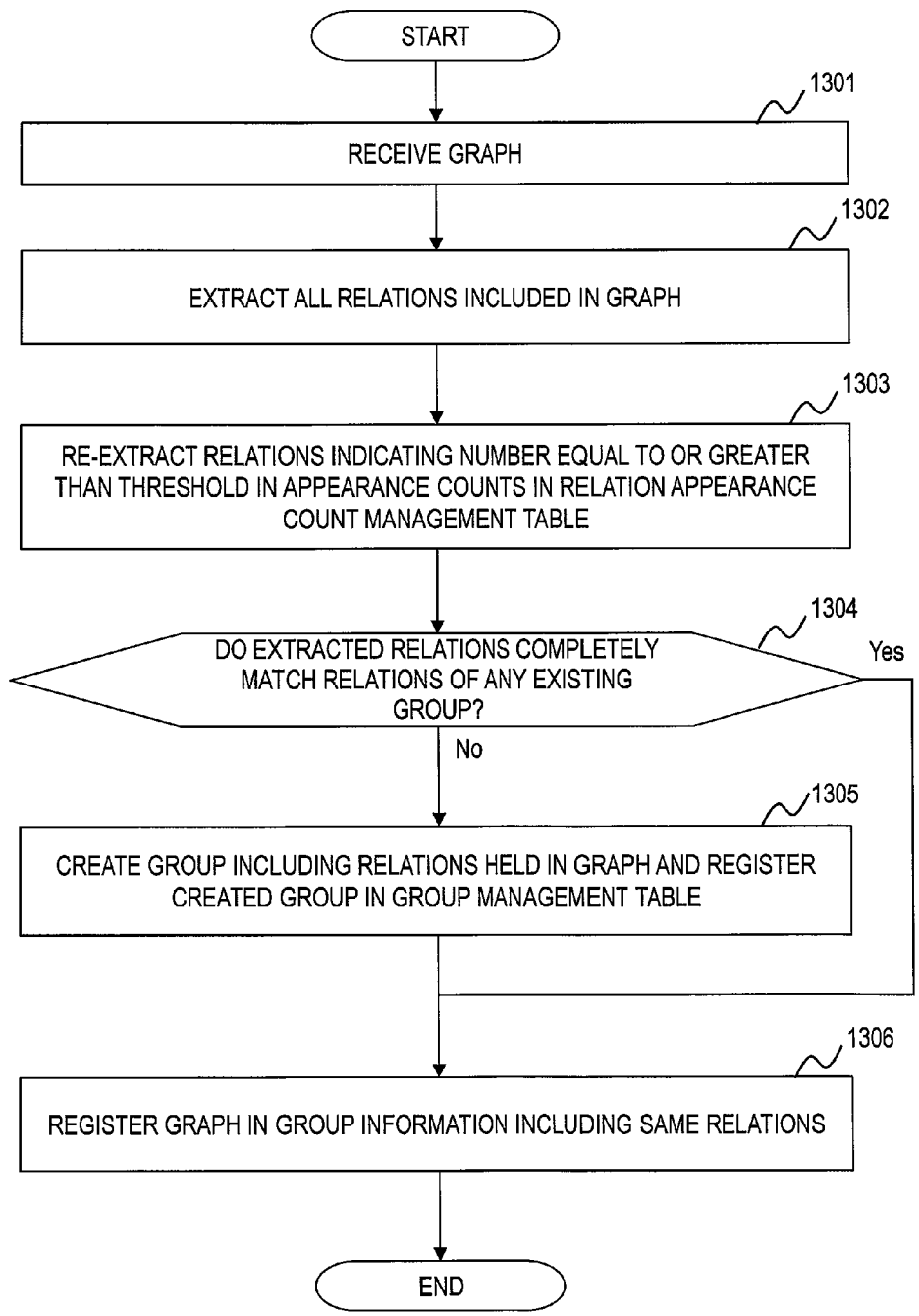
FIG. 16 is a flowchart illustrating an example of processing of the graph data distributed administration manager to classify a graph into a group excluding relations appearing in low frequency according to the fourth embodiment of this invention.

FIG. 16 is a flowchart illustrating an example of processing of the graph data distributed administration manager 131 to classify a graph into a group excluding relations appearing in low frequency.

First, the graph data reception module 201 receives a graph through the communication device 113 of the management computer 101 and sends it to the relation extractor 202 (Step 1301). The relation extractor 202 extracts data relations included in the received graph and sends them to the group creator (Step 1302).

The group creator 203 retrieves the relation appearance count management table 900 shown in FIG. 15 from the storage device 114, re-extracts relations for which the appearance counts in the acquired relation appearance count management table 900 indicate numbers equal to or greater than a predetermined threshold from the relations received from the relation extractor 202, and proceeds to Step 1304 (Step 1303) The threshold may be a value input through the input device 115 of the management computer 101 or a number indicated in a specific row when sorting the appearance counts in the relation appearance count management table 900 in order of appearance count.

At Step 1304, the group creator 203 acquires the group management table 600 from the group information holder 204 and determines whether any graph group ID exists with which the elements of relations included in the relation list 602 completely match all the elements of relations re-extracted by the relation extractor 202.

If such a graph group ID exists, the group creator 203 proceeds to Step 1304; if no such graph group ID exists, the group creator 203 proceeds to Step 1305.

If no graph group ID exists, the group creator 203 proceeds to Step 1305, creates a group including all the relations re-extracted by the relation extractor 202 in a relation list 602 and a group ID 601 for uniquely identifying the group, and adds a new entry to the group management table 600.

Subsequently, the group creator 203 creates a graph ID 701 for uniquely identifying the received graph and adds a new entry to the group assignment management table 700 so as to associate the graph ID 701 with the group ID 601 (702) in one-to-one correspondence (Step 1306).

Through the above-described processing, the management computer 101 can create a graph group with relations appearing in high frequency and equally allocates graphs to a plurality of search execution computers 102. Such distributed administration of graphs can expedite searching since possible solutions are equally distributed among the search execution computers 102 when many possible solutions are extracted with a search condition including a relation appearing in high frequency.

Embodiment 5

When each group is created with data relations included in a graph, some relation may be partially common to a plurality of groups. Even in the case where possible solutions are acquired with this partially common relation, the graphs belonging to the groups should be allocated so that possible solutions will be equally distributed among the plurality of search execution computers 102 to achieve load balancing in condition matching.

The configuration of Embodiment 5 is the same as the one of Embodiment 1; the common elements are denoted by the same reference signs and explanation thereof is omitted.

To achieve load balancing, in condition matching even in the case where relations are partially common to groups, Embodiment 5 distributes and allocates graphs 70 held by the search execution computers 10 to search execution computers 102, considering the relations partially common to groups. In this processing, Embodiment 5 uses the graph data reception module 201, the data classifier 205, the group information holder 204, the data allocation determination module 206, the distributed node information holder 207, the graph data delivery module 208 included in the graph data distributed administration manager 131 shown in FIG. 2.

Figure 18:
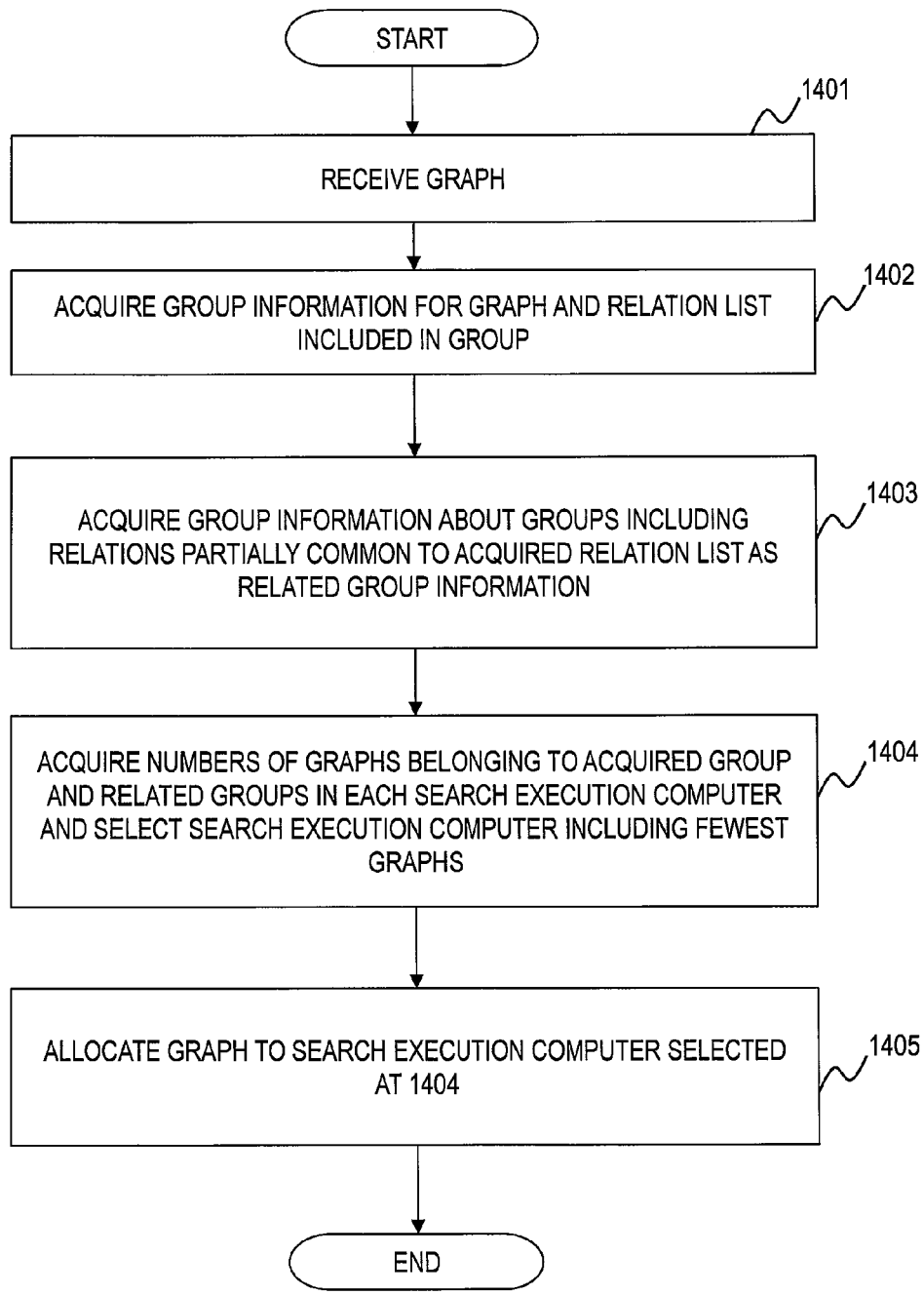
FIG. 18 is a flowchart illustrating processing for the graph data distributed administration manager to distribute and allocate graphs to search execution computers according to a fifth embodiment of this invention.

FIG. 18 is a flowchart illustrating processing for the graph data distributed administration manager 131 to distribute and allocate graphs to search execution computers 102.

First, the graph data reception module 201 receives a graph through the communication device 113 of the management computer 101 and sends it to the data classifier 205 (Step 1401).

The data classifier 205 acquires the group assignment management table 700 from the group information holder 204 and acquires the group ID 702 of the group the received graph belongs to. Subsequently, the data classifier 205 retrieves the group ID 601 corresponding to the acquired group ID 702 from the group management table 600. The data classifier 205 extracts a relation list 602 for the retrieved group ID 601 (Step 1402). Furthermore, the data classifier 205 acquires group IDs of the groups including each of the relations included in the extracted relation list 602 as related group IDs.

Subsequently, the data classifier 205 sends the graph, the group ID 601 of the group the graph belongs to, and the related group IDs to the data allocation determination module 206 (Step 1403).

At Step 1404, the data allocation determination module 206 acquires the allocation management table 800 from the distributed node information holder 207. Subsequently, the data allocation determination module 206 sums the numbers of graphs assigned the group ID and the relation group IDs in each search execution computer 102 to obtain the number of related graphs in each search execution computer 102. The data allocation determination module 206 extracts the search execution computer 102 indicating the fewest number of related graphs, sends the received graph together with the locational information on this search execution computer 102 to the graph data delivery module 208, and proceeds to Step 1405.

If a plurality of search execution computers 102 indicate the fewest allocated graphs, the data allocation determination module 206 may select a search execution computer 102 at random or may select the search execution computer 102 having the fewest allocated graphs found first or last. For the locational information on the search execution computer 102, an IP address indicating locational information in the network or an ID uniquely identifying a search execution computer may be used.

Next at Step 1405, the graph data delivery module 208 sends the received graph 70 to the search execution computer 102 at the locational information selected at Step 1404.

Through the above-described processing, Embodiment 5 provides a graph data distributed administration method that equally distributes various relations to a plurality of search execution computers 102. Such graph data distributed administration can provide a graph data distributed search method for searching equal graphs among the plurality of search execution computers in searching graphs including common data relations, which may result in retrieval of data pieces included in a plurality of groups.

Embodiment 6

In searching the graphs 70 distributed among the search execution computers 102, if the relation included most in the graphs 70 held in the search execution computers 102 is designated as a search condition, the largest number of possible solutions are extracted. Since condition matching is conducted to all the possible solutions, the time to complete the search increases with the number of possible solutions. Accordingly, the time required for distributed searching can be estimated by acquiring the number of data relations included in each search execution computer 102 and multiplying the number by a time required for condition matching per possible solution, enabling determination whether a search can be completed within a specified time using the result of the estimation.

In Embodiment 6, the management computer 101 estimates a time required for distributed searching and if determining that the searching will not be completed within a specified time, it adds a search execution computer 102 and reallocates the graphs to decrease the possible solutions extracted at each search execution computer 102.

Figure 19:
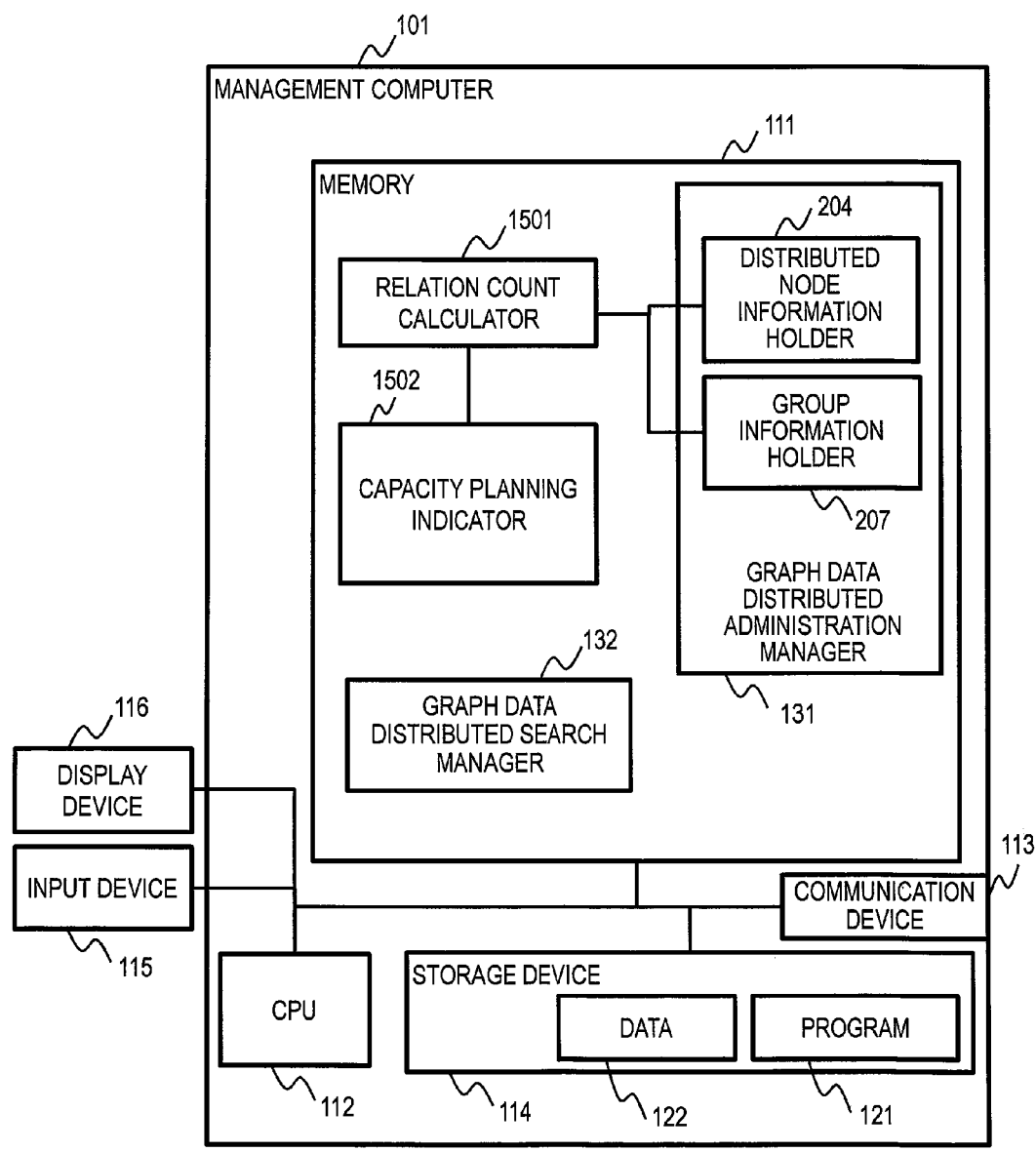
FIG. 19 is a block diagram illustrating an example of a configuration of the management computer according to a sixth embodiment of this invention.

The system configuration of Embodiment 6 is provided by adding a relation count calculator 1501 and a capacity planning indicator 1502 as illustrated in FIG. 19 to the management computer 101 of Embodiment 1; the rest of the configuration is the same as that of Embodiment 1. The common elements are denoted by the same reference signs and explanation thereof is omitted.

FIG. 19 is a block diagram illustrating an example of a configuration of the management computer. To indicate graph allocation required to assess the processing capabilities of the search execution computers 102, the management computer 101 provides a graph data capacity management function illustrated in FIG. 19. The management computer 101 links the distributed node information holder 204 and the group information holder 207, which are function modules included in the graph data distributed administration manager 131, with the relation count calculator 1501 and further includes a capacity planning indicator 1502. The capacity planning indicator 1502 shows information to estimate the time required for each search execution computer 102 to search the distributed graphs and indicates excess or deficiency in each search execution computer 102.

Figure 20:
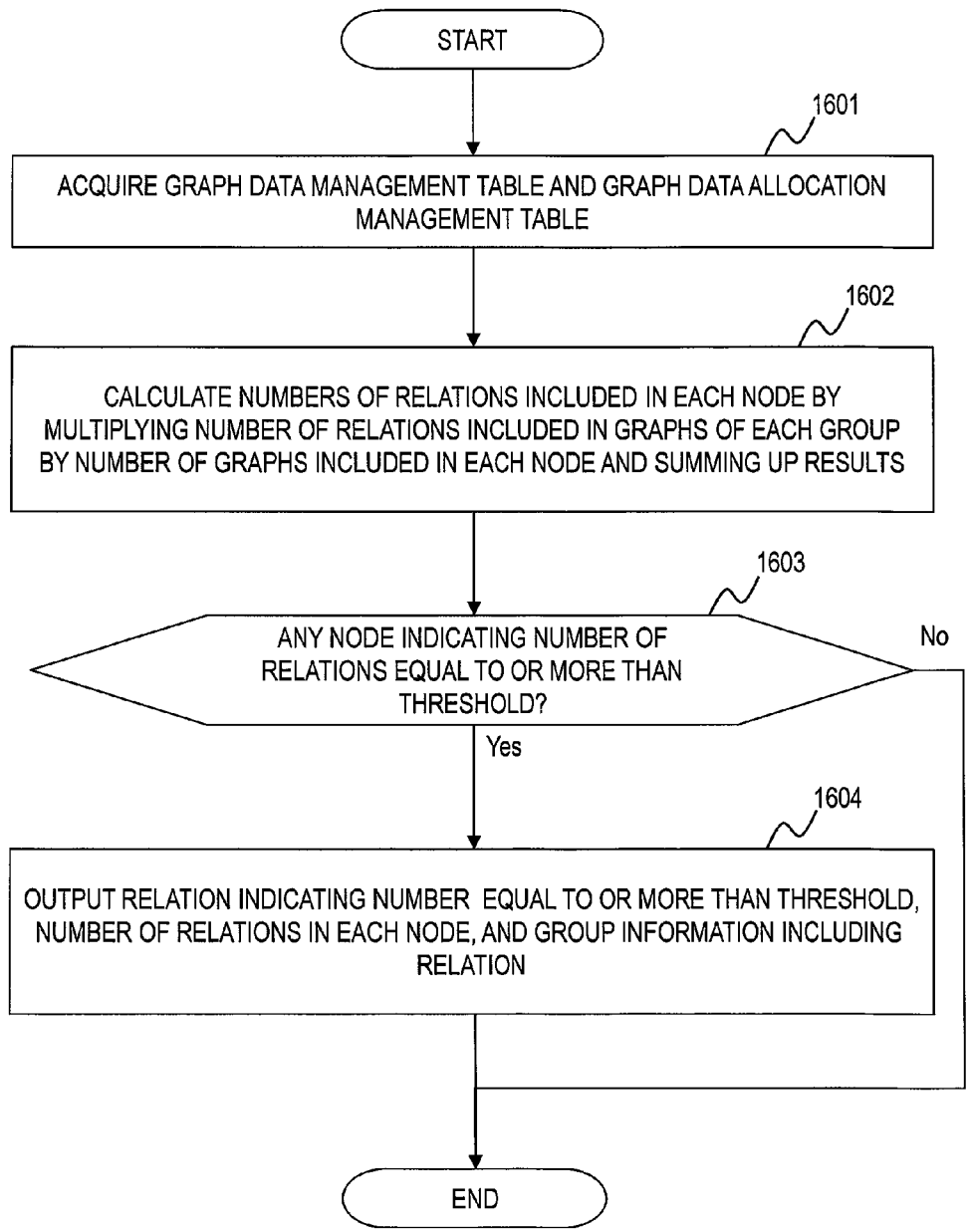
FIG. 20 is a flowchart illustrating an example of processing of the management computer to manage the capacity for graph data according to the sixth embodiment of this invention.

FIG. 20 is a flowchart illustrating an example of processing of the management computer 101 to manage the capacity for graph data.

First, the relation count calculator 1501 acquires the group management table 600 from the group information holder 207 and acquires the allocation management table 800 from the distributed node information holder 204 (Step 1601).

Next, the relation count calculator 1501 selects a relation (for example, NAME) included in a relation list 602 in the group management table 600 and acquires the group IDs of the groups including the selected relation in relation lists. Subsequently, with reference to the allocation management table 800, the relation count calculator 1501 sums up the numbers associated with the acquired group IDs 601 in the column of a given search execution computer 102 (Step 1602). As a result, the number of relations (in an example, the number of NAMEs) included in the given search execution computer 102 can be obtained. The relation count calculator 1501 performs this processing on all of the search execution computers 102 and all of the relations.

Next, at Step 1603, the relation count calculator 1501 determines whether any search execution computer 102 exists that includes a number of relations equal to or more than a threshold. If some search execution computer 102 including relations equal to or more than the threshold exists, the relation count calculator 1501 proceeds to Step 1604 and if no such search execution computer 102 exists, it exits the processing. The threshold may be a predetermined fixed value or a value received through the input device 115 of the management] computer 101. Alternatively, with reference to the previous search times stored in advance, the number of possible solutions that have taken longer than a specific time to be retrieved may be employed as the threshold, or the relation appearing most in the search execution computers 102 may be employed as the threshold.

At Step 1604, the capacity planning indicator 1502 outputs the relation in number equal to or more than the threshold, the number of relations included in each search execution computer 102, and group information on the groups including the relation to the display device 116.

Through the above-described processing, the number of possible solutions that require condition matching in searching the graphs distributed among a plurality of search execution computers 102 with search conditions including the relation leading to retrieval of the largest number of possible solutions can be acquired. From this number of possible solutions, the search time including condition matching can be estimated. To reduce the search time, information recommending to add a search execution computer 102 or reallocate the graphs in the search execution computers 102 can be presented.

Embodiment 7

A scheme for expressing data called RDF (Resource Description Framework), which is standardized by the W3C (World Wide Web Consortium), has been known. The RDF defines to express data indicating relations of resources with three elements of subject, predicate, and object. A set of these three elements are called a triple. In the triple, the subject and the object represent data values and the predicate represents a relation between the subject and the object. The subject included in a triple can be the object of a different triple; a plurality of triples can express a set of data. The set of data formed by connecting a plurality of triples has the same structure as the graph handled by this invention.

As a query language for searching graphs expressed in the RDF, the W3C has recommended SPARQL (SPARQL Query Language). In searching graphs in SPARQL, after extracting possible solutions matching a data value represented by a subject or object defined by the RDF scheme or a relation represented by a predicate, condition matching can be conducted on the possible solutions.

As to these graphs expressed in the RDF scheme, like in the above-described Embodiment 1 to Embodiment 6, graphs including common predicates or relations can be classified as the same group, and distributed and allocated to a plurality of search execution computers 102 to achieve load balancing and higher-speed processing in searching by conducting parallel searches.

Embodiment 8

In order to cross-sectionally administrate and search a variety of data, such as text, audio, image, and video data, the information included in each type of data should be administrated in the same format and searched in the same scheme. For example, in content cloud architecture for automatically aggregating data stored in multiple storages to a data center via a network, the same format of the information and the same search scheme are required.

To administrate information in the same format and search the information in the same scheme, metadata can be used. The metadata is data about data extracted from a variety of computerized content data such as text, audio, and image data through a variety of recognition processing. For the recognition processing, publicly or commonly known techniques can be used; for example, a technique that obtains feature values of audio, image or video and generates metadata from the feature values may be used as appropriate.

Since metadata includes information about a variety of data, it is preferable to employ the graph structure that can express metadata with data values and relations. Taking image data of a blue car as an example, the graph representing its metadata is composed of a data piece having a data value of "Car" connected by a relation of "Color" with a data piece having a data value of "Blue".

To search a variety of data such as text, audio, image, and video data using metadata extracted in this way, required is a storage apparatus for integrally managing the actual data in association with the graph of metadata. It should be noted that since the data such as text, audio, image, and video data is larger in volume compared to metadata, the storage apparatus is required to have a large capacity, namely a storage apparatus including multiple disk devices.

In an environment for cross-sectionally administrating a variety of data such as text, audio, image, and video data, speedy data retrieval can be achieved by distributed search of the metadata in the graph structure using a plurality of search execution computers 102.

Figure 21:
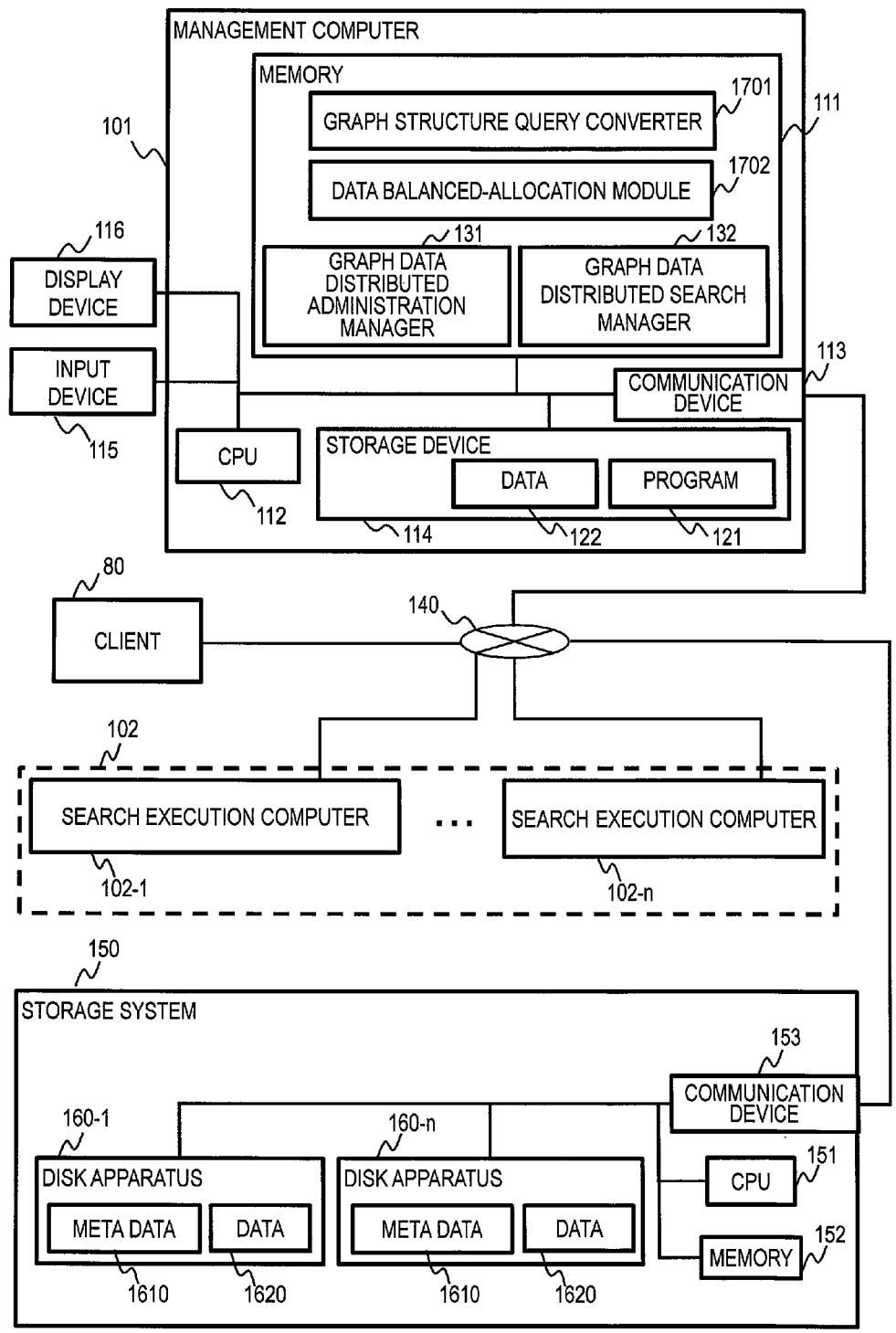
FIG. 21 is a block diagram illustrating an example of a computer system for graph data distributed administration and search according to an eighth embodiment of this invention.

To apply the above-mentioned metadata of a variety of data such as text, audio, image, and video data to this invention, a computer system illustrated in FIG. 21 can implement distributed administration and parallel searching of metadata.

FIG. 21 is a block diagram illustrating an example of a computer system for graph data distributed administration and search. The system configuration of Embodiment 8 is provided by adding a storage apparatus 150 and, as function modules in the management computer 101, a graph structure query converter 1701 and a data balanced-allocation module 1702 to the configuration illustrated in FIG. 1 of Embodiment 1. The rest of the configuration is the same as that of Embodiment 1. The common elements are denoted by the same reference signs and explanation thereof is omitted.

The storage apparatus 150 includes a CPU 151, a memory 152, and a communication device 153 and is connected with a management computer 101, search execution computers 102, and a client 80 via a network 140. The storage apparatus 150 includes a plurality of disk devices 160-1 to 160-*n* and stores metadata 1610 and data 1620, such as text, audio, image, and video data, corresponding to the metadata. The CPU 151 executes a control program loaded to the memory 152 to control the communication device 153 and the disk devices 160-1 to 160-*n*. Hereinafter, the disk devices 160-1 to 160-*n* are generally denoted by a reference sign 160.

The graph structure query converter 1701 converts a search request received from the client 80 requesting a search into a search query for graphs. The data balanced-allocation module 1702 controls data allocation to balance the I/O load to the plurality of disk devices 160 included in the storage apparatus 150.

The graph structure query converter 1701 holds relations included in graphs expressing metadata 1610 and classifies conditions on the type or category of the data 1620 in the search conditions received from the client 80 as relations and the other conditions as data values to create a query for graphs. The graph structure query converter 1701 sends the created query to the graph data distributed search manager 132 to conduct a distributed search of graphs. For example, the search conditions to be classified as relations are class information indicating categories such as "Vehicle", "Fruit", "Name", and "Age"; the search conditions to be classified as data values are instance information indicating the substance of the class information such as a fruit spelled with an initial letter "A", a name including a character string "Taro", and an age "Over twenty". The graph structure query converter 1701 can create a query including instance information connected by class information.

The data balanced-allocation module 1702 determines data allocation to a plurality of disk devices 160 so that a plurality of search execution computers 102 will not access the same disk device 160 to prevent I/O load concentration.

Specifically, the data balanced-allocation module 1702 allocates a dedicated disk device 160 to each search execution computer 102 and allocates metadata 1620 in the graph structure and data 1620 such as text, audio, image, or video data, corresponding to the metadata distributed by the graph data distributed administration manager 131 to the disk devices 160 correspondingly dedicated to the search execution computers 102. For example, the disk devices 160 are allocated to the search execution computers 102 in one-to-one correspondence.

In administrating a variety of data such as text, audio, image, and video data using metadata in the graph structure extracted through recognition processing, the above-described processing can balance the load caused by retrieving desired data among a plurality of search execution computers 102.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration. The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. As a matter of fact, it can be considered that almost of all components are interconnected.

What is claimed is:
1. A data distributed search system comprising:
  a management computer including a processor and a memory;
  a plurality of search execution computers each including a processor and a memory; and
  a network connecting the management computer and the plurality of search execution computers,
  wherein the memory of the management computer stores instructions that cause the processor of the management computer to execute:
    a distributed administration manager for receiving a plurality of graphs, each of the graphs holding at least one relation connecting a data value with another data value and being composed of data pieces connected by the at least one relation, and distributing the graphs to the plurality of search execution computers; and
    a distributed search manager for sending search conditions to the plurality of search execution computers upon receipt of the search conditions and receiving search results from the plurality of search execution computers,
  wherein the distributed administration manager of the management computer classifies two or more of the graphs including at least one common relation as a group and distributes and allocates the graphs belonging to the group among the plurality of search execution computers,
  wherein the distributed search manager of the management computer sends search conditions, including a first search condition on a data relation and a second search condition on a data value, to each of the plurality of search execution computers to request to conduct a parallel search, wherein, for each of the search execution computers, the memory thereof stores instructions that cause the processor thereof to execute:
- a graph storage module for storing the graphs received from the management computer; and
- a search execution module for searching the graphs stored in the graph storage module with the search conditions received from the management computer and returning a search result to the management computer, wherein the search execution module in each of the plurality of search execution computers extracts graphs matching the first search condition as possible solutions and conducts condition matching on data values included in the graphs extracted as possible solutions with the second search condition to acquire a data piece of which the data value matches the search condition on data value as the search result.

2. The data distributed search system according to claim 1,
wherein, when the distributed administration manager of the management computer classifies the two or more graphs including at least one common relation as the group, the other data value connected by the at least one common relation is a data value on which the condition matching is to be conducted with the second search condition.

3. The data distributed search system according to claim 1,
wherein, in classifying the two or more graphs including at least one common relation as the group, the distributed administration manager of the management computer acquires numbers of times of past retrieval of data values of data pieces to which relations connect and classifies the two or more graphs including at least one common relation connecting to a data piece whose data value has been retrieved for a number of times equal to or greater than a first threshold.

4. The data distributed search system according to claim 1,
wherein, in classifying the two or more graphs including at least one common relation as the group, the distributed administration manager of the management computer acquires numbers of relations included in all of the graphs stored in each of the plurality of search execution computers and classifies the two or more graphs including at least one common relation with which a number of relations is equal to or greater than a second threshold.

5. The data distributed search system according to claim 1,
wherein, in distributing and allocating the graphs of the group among the plurality of search execution computers, the distributed administration manager of the management computer selects a search execution computer allocated the fewest numbers of the graphs of the group created with elements of at least one relation common with at least one relation included in a graph to be allocated and stores the graph to be allocated to the selected search execution computer.

6. The data distributed search system according to claim 1,
wherein the management computer further includes a planning module for acquiring numbers of relations included in the graphs in each of the plurality of the search execution computers and, in a case where a search execution computer including the relations equal to or more than a third threshold exists, outputting information recommending addition of a search execution computer and reallocation of the graphs.

7. The data distributed search system according to claim 1,
wherein the graphs are data expressed in Resource Description Framework (RDF) format, and
wherein the search conditions are in SPARQL Protocol and RDF Query Language (SPARQL).

8. The data distributed search system according to claim 1,
wherein, in each of the graphs, the data value includes computerized content data, and
wherein the at least one relation and the other data value connected with the computerized content data by the at least one relation include metadata created from the computerized content data.

9. The data distributed search system according to claim 1,
wherein the plurality of search execution computers are connected with a plurality of storage devices each provide physical storage for the graph storage module, and each of the plurality of search execution computers is allocated a dedicated storage device from the plurality of storage devices.

10. A data distributed search method for searching a plurality of graphs at a plurality of search execution computers using a management computer including a processor and a memory, and the plurality of search execution computers each including a processor and a memory, the method comprising:
- a first step of receiving, by the management computer, graphs each holding at least one relation connecting a data value with another data value and being composed of data pieces connected by the at least one relation;
- a second step of distributing, by the management computer, the graphs to the plurality of search execution computers;
- a third step of storing, by the plurality of search execution computers, the graphs received from the management computer;
- a fourth step of sending, by the management computer, search conditions to the plurality of search execution computers upon receipt of the search conditions;
- a fifth step of searching, by the plurality of search execution computers, the graphs with the search conditions received from the management computer and returning search results to the management computer; and
- a sixth step of receiving, by the management computer, the search results from the plurality of search execution computers, wherein the second step classifies two or more of the graphs including at least one common relation as a group and distributes and allocates the graphs belonging to the group among the plurality of search execution computers, wherein the fourth step sends search conditions including a first search condition on a data relation and a second search condition on a data value to each of the plurality of search execution computers to request to conduct a parallel search in the fifth step, and wherein the fifth step extracts graphs matching the first search condition as possible solutions and conducts condition matching on data values included in the graphs extracted as possible solutions with the second search condition to acquire a data piece of which the data value matches the search condition on data value as one of the search results at one of the search execution computers.

11. The data distributed search method according to claim 10,
wherein, in classifying the two or more graphs including at least one common relation as the group, the other data value connected by the at least one common relation is a data value on which the condition matching is to be conducted with the second search condition.

12. The data distributed search method according to claim 10,
wherein, in classifying the two or more graphs including at least one common relation as the group, the management computer acquires numbers of times of past retrieval of data values of data pieces to which relations connect and classifies the two or more graphs including at least one common relation connecting to a data piece whose data value has been retrieved for a number of times equal to or greater than a first threshold.

13. The data distributed search method according to claim 10,
wherein, in classifying the two or more graphs including at least one common relation as the group, the management computer acquires numbers of relations included in all of the graphs stored in each of the plurality of search execution computers and classifies the two or more graphs including at least one common relation with which a number of relations is equal to or greater than a second threshold.

14. The data distributed search method according to claim 10,
wherein, in distributing and allocating the graphs of the group among the plurality of search execution computers, the management computer selects a search execution computer allocated the fewest numbers of the graphs of the group created with elements of at least one relation common with at least one relation included in a graph to be allocated and stores the graph to be allocated to the selected search execution computer.

15. The data distributed search method according to claim 10, further comprising:
a sixth step of acquiring, by the management computer, numbers of relations included in the graphs in each of the plurality of the search execution computers and, in a case where a search execution computer including the relations equal to or more than a third threshold exists, outputting information recommending addition of a search execution computer and reallocation of the graphs.

16. The data distributed search method according to claim 10,
wherein the graphs are data expressed in Resource Description Framework (RDF) format, and
wherein the search conditions are in SPARQL Protocol and RDF Query Language (SPARQL).

17. The data distributed search method according to claim 10,
wherein, in each of the graphs, the data value includes computerized content data, and
wherein the at least one relation and the other data value connected with the computerized content data by the at least one relation include metadata created from the computerized content data.

18. The data distributed search method according to claim 10,
wherein the plurality of search execution computers are connected with a plurality of storage devices each provide physical storage to the graph storage module, and each of the plurality of search execution computers is allocated a dedicated storage device from the plurality of storage devices.

* * * * *